United States Patent [19]

Harper et al.

[11] Patent Number: 5,537,141
[45] Date of Patent: Jul. 16, 1996

[54] DISTANCE LEARNING SYSTEM PROVIDING INDIVIDUAL TELEVISION PARTICIPATION, AUDIO RESPONSES AND MEMORY FOR EVERY STUDENT

[75] Inventors: Gregory W. Harper; Michael J. Freeman, both of New York, N.Y.

[73] Assignee: ACTV, Inc., New York, N.Y.

[21] Appl. No.: 228,355

[22] Filed: Apr. 15, 1994

[51] Int. Cl.$^6$ .................................................. H04N 7/14
[52] U.S. Cl. ........................................... 348/12; 348/13
[58] Field of Search .............................. 348/15, 14, 13, 348/8, 16, 17, 705; 358/85; 379/53, 54; H04N 7/14, 7/15

[56] References Cited

U.S. PATENT DOCUMENTS

| | | |
|---|---|---|
| Re. 32,776 | 11/1988 | Saylor . |
| Re. 34,340 | 8/1993 | Freeman . |
| 2,612,533 | 9/1952 | Homrighous . |
| 2,777,901 | 1/1957 | Dostert . |
| 2,826,828 | 3/1958 | Hamiton . |
| 2,908,767 | 10/1959 | Fritzinger . |
| 2,921,385 | 1/1960 | Hamilton . |
| 3,008,000 | 11/1961 | Morchand . |
| 3,020,360 | 2/1962 | Gratian et al. . |
| 3,194,895 | 7/1965 | Treadwell . |
| 3,221,098 | 11/1965 | Feldman et al. . |
| 3,245,157 | 1/1966 | Laviana . |
| 3,255,536 | 6/1966 | Livingston . |

(List continued on next page.)

FOREIGN PATENT DOCUMENTS

| | | |
|---|---|---|
| 16314 | 10/1980 | European Pat. Off. . |
| 128481 | 12/1984 | European Pat. Off. . |
| 9094233 | 3/1962 | Germany . |
| 4-427885 | 6/1992 | Japan ................... H04N 7/14 |
| 6-165170 | 6/1994 | Japan ................... H04N 7/14 |
| 81/02961 | 10/1981 | WIPO . |
| 94/03851 | 2/1994 | WIPO . |

OTHER PUBLICATIONS

Harless, et al., "Interactive Videodisc Case Studies for Medical Education," 10th Ann. Symp. Computer Applications in Medical Care (Oct. 1986).

Bock, "Videodisk Standards: A Software View of the Technology," 8012 S.M.P.T.E. Journal, vol. 92 (1983).

*Primary Examiner*—Victor R. Kostak
*Attorney, Agent, or Firm*—Dorsey & Whitney

[57] ABSTRACT

An interactive distance learning system which provides individualized and meaningful interactive responses to each student, as if the student is receiving instruction directly from a private tutor or instructor. An interactive program transmission occurs to a diverse number of facilities and locations. The primary transmission is a live lecture by the person making the presentation on the distance learning system. The live lecture is accompanied by questions to gage comprehension by students. The questions, in interrogatory form, are graphically displayed on the screen either as video or overlaying the video showing the lecturer. In addition to the interrogatory question, a set of responses, one correct, the rest incorrect, are also presented for the student choice. A complimentary suite of affirmative supportive commentary is prepared and prerecorded for the plurality of correct and incorrect responses which might be given to a question. Each response teaches, confirms and encourages the learning experience. A processor, branching codes and a memory device can be used to create a large variety of responses to provide an individual response for every student who responds to an interrogatory. A different response is created for every answer given to every question. Video or disk recordings of presentations can be prerecorded to demonstrate concepts or ideas or simply expand on lectured points and can be switched in and out of the video presentation of the live lecture as the instructor chooses. The transmitted interactive signal can be recorded for later playback and remain fully interactive. An extremely flexible, relatively inexpensive system is thus created which uniquely teaches and uniquely addresses the needs of every student participating in the interactive distance learning system experience.

36 Claims, 10 Drawing Sheets

U.S. PATENT DOCUMENTS

| | | |
|---|---|---|
| 3,273,260 | 9/1966 | Walker . |
| 3,284,923 | 11/1966 | Leslie . |
| 3,343,280 | 9/1967 | Tolnai . |
| 3,366,731 | 1/1968 | Wallerstein . |
| 3,387,084 | 6/1968 | Hine et al. . |
| 3,440,342 | 4/1969 | Beltrami . |
| 3,477,144 | 11/1969 | Stillit . |
| 3,484,950 | 12/1969 | Serrell et al. . |
| 3,485,946 | 12/1969 | Jackson et al. . |
| 3,538,621 | 11/1970 | Mayeda . |
| 3,546,791 | 12/1970 | Koos et al. . |
| 3,575,861 | 4/1971 | Flossmoor, III . |
| 3,602,582 | 8/1971 | Torricelli . |
| 3,623,238 | 11/1971 | Laplume et al. . |
| 3,665,615 | 5/1972 | Laplume . |
| 3,708,891 | 1/1973 | Rosov . |
| 3,725,571 | 1/1973 | Justice . |
| 3,730,980 | 5/1973 | Kirk, Jr. . |
| 3,757,225 | 9/1973 | Ulicki . |
| 3,763,577 | 10/1973 | Goodson . |
| 3,774,316 | 11/1973 | Maier . |
| 3,814,841 | 6/1974 | Ulicki . |
| 3,833,760 | 9/1974 | Tickle . |
| 3,849,594 | 11/1974 | Justice . |
| 3,857,999 | 12/1974 | Justice . |
| 3,860,745 | 1/1975 | Takada . |
| 3,902,007 | 8/1975 | Justice . |
| 3,916,092 | 10/1975 | Justice . |
| 3,936,595 | 2/1976 | Yanagimachi et al. . |
| 3,947,972 | 4/1976 | Freeman . |
| 3,988,528 | 10/1976 | Yanagimachi et al. . |
| 3,991,266 | 11/1976 | Baer . |
| 4,034,990 | 7/1977 | Baer . |
| 4,044,380 | 8/1977 | Justice et al. . |
| 4,245,245 | 1/1981 | Matsumoto et al. . |
| 4,264,924 | 4/1981 | Freeman . |
| 4,264,925 | 4/1981 | Freeman et al. . |
| 4,290,142 | 9/1981 | Schnee et al. . |
| 4,292,649 | 9/1981 | Macheboeuf . |
| 4,305,131 | 12/1981 | Best ........................... 364/521 |
| 4,331,974 | 5/1982 | Cogswell et al. . |
| 4,333,152 | 6/1982 | Best . |
| 4,361,730 | 11/1982 | Barber et al. . |
| 4,381,522 | 4/1983 | Lambert . |
| 4,422,105 | 12/1983 | Rodesch et al. . |
| 4,439,784 | 3/1984 | Furukawa et al. . |
| 4,445,137 | 4/1984 | Panofsky . |
| 4,445,187 | 4/1984 | Best . |
| 4,507,680 | 3/1985 | Freeman . |
| 4,516,156 | 5/1985 | Fabris et al. ...................... 358/85 |
| 4,530,008 | 7/1985 | McVoy . |
| 4,536,791 | 8/1985 | Campbell et al. . |
| 4,546,382 | 10/1985 | McKenna et al. . |
| 4,555,730 | 11/1985 | Briggs . |
| 4,569,026 | 2/1986 | Best . |
| 4,571,640 | 2/1986 | Baer . |
| 4,573,072 | 2/1986 | Freeman . |
| 4,574,305 | 3/1986 | Campbell et al. . |
| 4,591,248 | 5/1986 | Freeman . |
| 4,599,611 | 7/1986 | Bowker et al. . |
| 4,602,279 | 7/1986 | Freeman . |
| 4,616,261 | 10/1986 | Crawford et al. . |
| 4,635,132 | 1/1987 | Nakamura . |
| 4,644,515 | 2/1987 | Allebest et al. . |
| 4,647,980 | 3/1987 | Steventon et al. . |
| 4,694,490 | 9/1987 | Harvey et al. . |
| 4,701,896 | 10/1987 | Allebest et al. . |
| 4,704,725 | 11/1987 | Harvey et al. . |
| 4,733,301 | 3/1988 | Wright, Jr. . |
| 4,734,764 | 3/1988 | Pocock et al. . |
| 4,750,036 | 6/1988 | Martinez . |
| 4,763,317 | 8/1988 | Lehman et al. . |
| 4,768,087 | 8/1988 | Taub et al. ...................... 358/84 |
| 4,777,529 | 10/1988 | Schultz et al. . |
| 4,780,757 | 10/1988 | Bryer et al. . |
| 4,780,758 | 10/1988 | Lin et al. . |
| 4,785,349 | 11/1988 | Keith et al. . |
| 4,786,967 | 11/1988 | Smith, III et al. . |
| 4,807,031 | 2/1989 | Broughton et al. . |
| 4,816,905 | 3/1989 | Tweedy et al. . |
| 4,821,101 | 4/1989 | Short . |
| 4,839,743 | 6/1989 | Best et al. . |
| 4,846,693 | 7/1989 | Baer . |
| 4,847,690 | 7/1989 | Perkins . |
| 4,847,698 | 7/1989 | Freeman . |
| 4,847,700 | 7/1989 | Freeman . |
| 4,855,827 | 8/1989 | Best . |
| 4,862,268 | 8/1989 | Campbell et al. . |
| 4,875,096 | 10/1989 | Baer et al. . |
| 4,876,592 | 10/1989 | Von Kohorn . |
| 4,894,789 | 1/1990 | Yee . |
| 4,905,094 | 2/1990 | Pocock et al. . |
| 4,918,516 | 4/1990 | Freeman . |
| 4,924,303 | 5/1990 | Brandon et al. . |
| 4,926,255 | 5/1990 | Von Kohorn . |
| 4,930,019 | 5/1990 | Chu . |
| 4,949,170 | 5/1990 | Yangidaria et al. . |
| 4,965,825 | 10/1990 | Harvey et al. . |
| 4,975,771 | 12/1990 | Kassatly . |
| 4,987,486 | 1/1991 | Johnson et al. . |
| 4,988,111 | 1/1991 | Gerlitz et al. . |
| 4,989,233 | 1/1991 | Schakowsky et al. . |
| 4,989,234 | 1/1991 | Schakowsky et al. . |
| 4,991,011 | 2/1991 | Johnson et al. . |
| 4,994,908 | 2/1991 | Kuban et al. . |
| 5,001,554 | 3/1991 | Johnson et al. . |
| 5,010,400 | 4/1991 | Oto . |
| 5,010,500 | 4/1991 | Makkuni et al. . |
| 5,014,125 | 5/1991 | Pocock et al. . |
| 5,023,707 | 6/1991 | Briggs . |
| 5,034,807 | 7/1991 | Von Kohorn . |
| 5,051,822 | 9/1991 | Rhoades . |
| 5,053,883 | 10/1991 | Johnson . |
| 5,055,924 | 10/1991 | Skutta . |
| 5,057,915 | 10/1991 | Von Kohorn . |
| 5,077,607 | 12/1991 | Johnson et al. . |
| 5,090,708 | 2/1992 | Gerlitz et al. . |
| 5,093,718 | 3/1992 | Hoarty et al. . |
| 5,109,414 | 4/1992 | Harvey et al. . |
| 5,133,079 | 7/1992 | Ballantyne et al. . |
| 5,157,491 | 10/1992 | Kassatly . |
| 5,174,759 | 12/1992 | Preston et al. ...................... 434/317 |
| 5,176,520 | 1/1993 | Hamilton ...................... 434/350 |
| 5,177,604 | 1/1993 | Martinez . |
| 5,181,107 | 1/1993 | Rhoades . |
| 5,220,420 | 6/1993 | Hoarty et al. . |
| 5,227,874 | 7/1993 | Von Kohorn . |
| 5,236,199 | 8/1993 | Thompson, Jr. . |
| 5,247,347 | 9/1993 | Litteral et al. . |
| 5,318,450 | 6/1994 | Carver ...................... 434/336 |

For question 1

Solve the equation (5+6) - (4+2) = the correct answer is

- A-11
- B-6
- C-5
- D-17

DISTANCE LEARNING SYSTEM PROVIDING INDIVIDUAL TELEVISION PARTICIPATION, AUDIO RESPONSES AND MEMORY FOR EVERY STUDENT

BACKGROUND OF THE INVENTION

The interactive television program is of a type disclosed in commonly copending U.S. Patent application Ser. No. 07/797,298, filed Nov. 25, 1991, and in U.S. Pat. Nos. 4,847,700, 4,507,680, 4,573,072, 3,947,792, 4,602,279, 4,264,925, and 4,264,924, the contents of which are incorporated herein by reference.

Distance learning systems offer unique opportunities for providing solutions to many of the increased needs of our educational system today. Experienced expert teachers can be brought to any classroom in any location to provide high quality instruction. Distance learning technology represents an integration of proven technologies that eliminates the social and economic distinctions between different classrooms. With distance learning systems, students in a small school within a depressed area can receive the same quality instruction as that received in more privileged localities.

Most experts agree that education is the key to the future of our society. Unfortunately, the classroom suffers from technical neglect and lack of creativity which would enhance the instructor teaching capabilities. In conventional classrooms, it is virtually impossible for a teacher to provide one-to-one interaction with more than a dozen students within a single class period. Without this necessary interaction, student attentiveness and apparent interest decline, especially in lectures that do not encourage student participation. Therefore, the challenges are to empower all students, enhance the quality of education, and provide these benefits while utilizing technology which is transparent to instructors and students alike.

While technology has provided society with vast improvements in quality of life and productivity during this century, the classroom has not been a prime benefactor of technological improvements and innovations. However, this is beginning to change. Computer supported interactive classrooms, or distance learning systems, have been shown to enhance learning by supplying the teacher with relatively inexpensive technology to increase classroom interactiveness and student attentiveness.

Successful application of distance learning systems has involved interaction between the teacher, at a host site, and students at remote receive sites. When broadcast technology was first applied to integrate classrooms within states and between states, simple talkback circuits from the remote sites were sufficient for meeting the limited educational qualitative requirements. The talkback circuits provide an instructor at a centralized facility feedback on student performance. Some of these distance learning systems also provide minimal feedback to users based on the user responses to questions asked by the instructor. However, the extent of such system response to user interaction has been limited to "right/wrong" type responses displayed on a keypad.

Representative of these systems is the NTN Interactive System as utilized on the Kentucky Educational Television (KET) network and the Viewer Response System by One Touch Systems. Both of these systems use talkback circuits that link remote sites back to a centralized site, provide a host computer with customized software, site controllers, and simple-to-use keypads for entering student responses. The KET system provides battery powered keypads which link back to a site controller via a two way RF link. In other systems, keypads connect to a site controller either by cable or IR datalink. The KET keypad includes an LCD display that indicates if the participants got a question right or wrong. The simple right or wrong responses are prestored at the site controller. The RF site controller collects responses from up to twelve keypads. The instructor's lecture, originating at a host site, is broadcast by satellite to either one or several remote site locations. Each participant can respond to multiple-choice questions, TRUE/FALSE questions, etc., by pressing function keys. Remote site controllers connect back to the host site computer via dial-up telephone lines or X.25 packet networks. Participant responses are collected electronically by microprocessor based site controllers and transmitted to a centralized data collection center at the host. These systems allow for automatic scoring of examinations, print out of detailed performance reports at the central site, or graphics display of results to the instructor. The instructor can call on any viewer, or a viewer may request an explanation from the instructor.

The ABL system is at the very high end of distance learning systems. This system utilizes videoconferencing technology to connect an instructor with students at multiple locations. This two-way interactive system provides for full communications of video, voice and data between the students and the instructor. Each student in every classroom has a video monitor, personal computer, video camera, microphone and communications link to/from the head-end. This system requires a high capacity transmission system such as that provided by DS-3 lines. At the head-end, the instructor can open windows on the screen and see and hear individual students. To ask questions, students can raise their hands electronically, to signal the instructor. The instructor can then interact with that student by opening that student's window on the screen. During this time, the other students are passively waiting for the instructor to recommence his or her lecture, or are seeing and hearing the interaction with the selected student.

Today, however, management of classroom instruction via direct learning systems has become complex and overburdened given the ever expanding enrollment of students in classrooms. The current systems don't individualize programming sufficiently for a large number of students. These systems provide minimal interaction with students and the majority of students are simply passively viewing the instructor's broadcast. The only real interaction to students comes in the form of "right/wrong" feedback on the student keypad display or by teacher to student interaction via the talkback circuits. However, a teacher can only talk to one student at a time on the talkback circuit. Therefore, no student receives individual attention without burdening the rest of the students. The rest are actually passively viewing the interactivity of the others. Empowerment, therefore, is limited to a few students.

In addition, recording of programs in current distance learning systems is impossible because the interactive programming requires an on-line linkup between the classroom sites and the head-end. In other words, interactive programming in current systems requires essentially two networks or a duplex network; one video network to transmit video from the head-end to the classroom sites and a second network to provide a return link for either video, data or audio from the classroom sites back to the head-end. This lack of recordability necessarily limits the convenience, flexibility and practicality of providing distance learning technology to remote classrooms. The remote classrooms must be available to participate in the program specifically at the precise designated time scheduled for the lecture. Such scheduling may be very difficult for classrooms in different time zones.

To meet the educational challenges of the future, more interaction and less passive viewing is needed. In other words, what is needed is a system that allows immediate instructional feedback to each student on every question, regardless of class size. The feedback should go beyond mere "right" or "wrong" responses, but should include explanations to the students of their incorrect choices. The system must provide this high level of interactivity inexpensively by being compatible with the current transmission infrastructure and by using current hardware. A system is needed that makes it easy and affordable for teachers to create programs. A system is needed for equal participation by and contribution from all students. What is needed is a system that allows recording of interactive programming so that interactive elements remain with the recorded program so that students need not follow the time schedule of the instructor. This is relevant for those classroom sites located in different time zones or that have conflicting scheduling demands. A system is needed that remembers a student's earlier answers to pattern a more insightful answer. In addition, the system must provide the teacher complete control of the course preparation so that the technology does not "take over" the teaching process. Such systems must also allow teachers to bring to bear all of their creativity and improvisional skills to address difficult topics in order "to avoid the blank stare" syndrome. The invention described in this application is designed to serve these needs.

SUMMARY OF THE INVENTION

The present invention, A DISTANCE LEARNING SYSTEM PROVIDING INDIVIDUAL TELEVISION PARTICIPATION, AUDIO RESPONSES, AND MEMORY FOR EVERY STUDENT, provides each participant in a program an individualized and personalized learning experience. Educational television or video is dramatically enhanced in the present invention by making the viewer interactively participate in the program and by providing one-to-one teacher to student instantaneous feedback. By creating this more intimate relationship between the viewer and the program, a novel, exciting kind of distance learning system is created. By combining the best of interactive technology and existing distance learning technology, a unique tool has been invented that gives each student a real interactive experience, while providing teachers with maximum flexibility to be as creative and innovative as possible.

With the current invention, a large classroom of students can view the same video on a single common display monitor, but each student can carry on a completely different dialogue with the interactive program. Individual learning weaknesses receive the kind of focused personalized attention and feedback heretofore not possible. This high degree of individual participant interactivity is preferably provided via only one standard video signal.

One new aspect of the present invention is the ability to record transmitted interactive programs for later use or more convenient playback. As mentioned above, recording in current distance learning systems is impossible due to the two-way nature of such systems. With the present invention, classrooms with scheduling conflicts or in different time zones can simply record the earlier broadcast and playback the interactive program at a later more convenient time. Recordability is possible since the audio and data driving the keypads at the remote sites are embedded in the video signal creating a one-way broadcast technology.

Teaching by nature is not interactive. For example, in a normal live lecture, a teacher will ask the class a question. Several students may raise their hands to answer the question. One student is selected to answer the question and the teacher responds by providing some feedback to that student. Meanwhile, other students sit passively and inattentively without receiving any feedback to their own correct or incorrect answer choices.

The present invention solves this problem and goes far beyond the level of interaction provided by the other distance learning systems described above. The distinguishing aspect of the present invention is that no longer is one-to-one interaction between a teacher and each student an impossibility in large classrooms. Complete student interaction is now possible and passive viewing is eliminated from the distance learning system classroom. The educational interactive power of the present invention is enormous. In the present invention, when the instructor asks a question, each and every student responds to the question, and each student immediately receives a meaningful and substantive audio response in the instructor's own voice. For example, an instructor's lecture can be broadcast to multiple classrooms across the nation. Each classroom may contain a few or literally hundreds of students. All of the students watch a common video of the instructor delivering his or her lesson. When a question is posed to the students from either the instructor or presentation of a graphics interrogatory message with correct and incorrect answers overlaid onto the video, each student responds by selecting an input or entering a value on a keypad corresponding to an answer choice to the question. Almost immediately after making the selection, it is possible for the student to hear a distinct and substantive audio response to the student's own answer selection. This response is different from the audio responses many other students are hearing at the same time. In this manner, personalized audio feedback is provided to each and every student.

A major aspect of this invention is the individualization of audio response. Each student receives a personalized audio response to the student's keypad selection. The audio response is normally a prepared prerecorded audio response recorded in the teacher's own voice pertaining to a particular answer choice. The audio response is preferably composed of one or more prerecorded audio tracks linked together uniquely at each student's headphones to form a complete personalized message in the instructor's own voice. The response can be directed to the student's current incorrect or correct answer selection, or may be based on several previous student selections through the provision of memory and logic in the system. Multiple audio responses forming the set of suitable responses to an interrogatory message are preferably sent as part of a standard video signal. The set of individual audio responses can be increased further by earlier preloading of additional responses in memory at the remote sites, as explained below.

Surprisingly, this powerful educational interactive capability is extremely cost effective and inexpensive. Currently, individualization of a video program with audio to the magnitude of the present invention could only be done with CDI or laser disc players. Such systems would require at least a disc player and monitor with processor for every student, making such a system very expensive and unaffordable to many school districts around the country. Furthermore, these systems require computer program expertise to create the interactive programs, further significantly increasing the costs. In comparison, the present invention is inexpensive because it is compatible with existing broadcast systems, program preproduction is simple and affordable, only one television set is required at each remote site, and each student interacts completely and uniquely with the interactive program simply through the use of a low cost keypad and headphones connected to a site controller.

As opposed to providing interactivity via multiple video channels, the provision of interactivity via multiple audio channels allows existing systems to be used. The present invention can be easily added to the existing transmission infrastructure, i.e. programming is preferably provided on a single NTSC signal and can be transmitted to receive sites using satellite, cable or television broadcast. Costs are further reduced, in comparison with existing distance learning systems, since the interactive program broadcast can be recorded with the taped or CD version retaining all the interactive elements. Therefore, the value of the present invention is the capability to reduce the social and economic distinctions between different classrooms across the country. Economically depressed school districts can afford the technology of the present invention.

The claimed distance learning system comprises the broadcast of an interactive distance learning program preferably through provision of one video signal with a plurality, two or more, of related embedded audio signals from a teacher control unit to multiple remote site locations, permitting each participant to interact differently with the television presentation and receive different responsive audio segments. Depressing a button on the keypad provides input to a processor which triggers unique algorithmic codes which produces a unique and individual message from a plurality of audio segments transmitted and those prestored at the classroom master unit or other central location. At the classroom sites, participants interact with the interactive program via a subscriber interface. Preferably, the subscriber interface is a keypad with attached headphones.

The interactive video program is prepared at the teacher control unit, or host site. The teacher control unit allows the teacher to create and introduce interactive elements during the live broadcast. Program authoring software on the instructor's personal computer allows the scripting of presentation aids off-line. The presentation aids, including preformatted questions, are available to assist the instructor during broadcast.

The presentation aids are easy to design and edit using customized software. The instructor creates a graphic slide on the computer comprising a question and possible answers. The instructor records in the instructor's own voice a verbal explanation for each of the answer choices thereby creating separate audio tracks. The instructor also records some standard messages that will be automatically combined with the audio answer response segments to form stacked compounded messages, at appropriate times. The software automatically formats the text into visually pleasing graphics and associates the multiple audio tracks corresponding to the instructor's verbal responses with the particular graphics segment. The graphics and related audio tracks are preferably stored in a relational database with pointers establishing the relationship between the graphics and audio elements. Preparation of the interactive program preferably occurs prior to broadcast.

The students watch on a television monitor a live or prerecorded video of the instructor teaching the lesson. The instructor, at an appropriate time during the lesson, preferably clicks on the PICON designated on the computer screen. At this time, the graphics slide is transmitted as video to the remote sites. The students view the graphics slide on a television at the remote site while the teacher talks over the slide and explains the question. The teacher then requests the students to answer the question, e.g. "OK, everyone please answer the question now." At this point, a plurality of related audio messages are embedded in the video signal and transmitted to the remote classroom sites. The student selects an answer by depressing a button on the keypad and the system responds to each student with an appropriate audio response. The number of possible audio responses can be further increased by using a process called stacking. Stacking is a process wherein audio feedback response options are expanded beyond the available number of channels available by linking a combination of individual audio segments separated in time in an appropriate fashion. For example, six possible audio responses can be provided with only four channels.

In addition, more than the four simultaneously transmitted audio response segments can be provided to the remote devices by preloading memory at the classroom master unit or at some other central location. Additional audio tracks can be sent at earlier points in time, preloaded into storage at the classroom site, later aligned with the live audio tracks in time, and presented simultaneously to the keypads. In this manner, a large library of related audio responses can be formed to enhance the individualized instruction to the student.

The graphics video is output from the instructor's personal computer to a video mixer. Additional inputs to the video mixer may include the video of the instructor and VCR or CD prerecorded video. The video mixer outputs a single video signal. The plurality of audio signals is combined with the single video signal along with interactive data codes in an inserter to form a single NTSC compatible video signal. In an analog embodiment, the audio channels and data are inserted in the vertical blanking interval (VBI) of the video signal. Alternatively, the audio channels, data and video signal can be digitally encoded and time division multiplexed into a single composite digital interactive signal.

At the receive sites, the signal passes to a multi-channel audio extractor. The extractor essentially reverses the process by which the audio and data signals were inserted into the video signal. The extractor is one element of the classroom master unit which also includes a controller (with associated memory), and data and voice interfaces. The classroom master unit provides for the site setup, contains software for scoring students, automatically creates customized printouts, handles remote diagnostics, and also provides an interface for return circuits to the teacher control unit at the headend. The classroom master unit preferably collects student responses electronically both after each question during the interactive program, prepares, class performance summary reports after the program, and transmits this data back to the teacher control unit.

In the present invention, each student in a distance learning classroom watches one or more television monitors at the front of the classroom in which a live broadcast or prerecorded program is displayed to the students. Each student uses a simple keypad and a pair of low-cost headphones to respond to questions that are displayed onto the monitor.

As the program progresses, at various points, determined by the instructor, the participants are asked to enter responses on the keypad. Interrogatory messages can be displayed in the graphics video. In a multiple-choice question mode, each participant selects a key corresponding to his or her choice. As a result of that selection, each viewer hears a personalized response, comprising one or more audio segments, in the instructor's own voice via the headphones. The audio response is directly related to the answer choice selected by the student. In other words, the system discloses a branching capability which, based on user selection, will branch to particular audio responses. The branch for each student may be different depending on the student's response(s).

In the present invention, the branching is preferably performed in the keypad. A branching algorithm, via branch codes, is downloaded from the teacher control unit to the classroom master unit and forwarded to the keypad processor. In the case of few students per classroom or a student at home, the master unit could be at a central location in the school or cable system headend or its function could easily be built into a set top box. The keypad processor stores the algorithm in associated RAM memory. The processor uses the algorithm to determine the proper channel to switch to according to the user selection. In this manner, each and every student in a classroom, which may contain anywhere from a few to hundreds of students, receives an individualized response to each question.

The distance learning system also has the advantage of remembering student responses and using these responses in choosing an audio response to present to the student. Memory branching is a technique of the present invention where an algorithm assembles audio responses according to the current and previous user inputs. Memory branching is accomplished by linking audio message segments together in a logical relationship. In this scheme, the keypad processor contains logic (preferably, in the software algorithm) and memory to store previous responses and to process these previous responses in the algorithm to control future audio channel selection.

Student responses are optionally sent from the classroom master unit back to the teacher control system via return paths. The return paths can be dial-up telephone lines or X.25 packet switched network, or other communications means. Preferably, the host computer at the teacher control unit receives student performance data, processes the data, displays the data in chart or graph form to the instructor so as to provide immediate feedback to the instructor on student performance. The instructor can use such feedback to focus attention on a particular class or particular student. Feedback return paths can also be established after the interactive session for receiving student data to generate report cards. However, because of the instantaneous feedback already provided to students via the one way interactive signal, the present invention does not require further feedback return paths to the teacher control unit.

Accordingly, a primary objective of this invention is providing an enhanced interactive program so that everyone in the audience can equally participate and interact in real time using a cost effective and easy to use system.

It is an object of the invention to provide a interactive programming for personalized instruction on a single video channel to multiple receiver sites.

It is an object of the invention to deliver instantaneously personalized feedback to students through the provision of branching between multiple simultaneously transmitted audio channels comprising different information content in response to interrogatory messages.

It is an object of the invention to increase the number of possible audio responses to the students through a stacking process of assembling audio messages separated in time into a logical message sequence.

It is an object of the invention to provide more than simply the simultaneously transmitted audio responses to the student keypads through a process of preloading additional audio response tracks into storage at the remote classroom site.

It is an object of the invention to allow a recording and playback capability without the requirement of a real time link while maintaining the same degree of interactivity.

It is an object of the invention to provide the distance learning system not only to classrooms, but also to individual participants at home.

It is an object of the invention to provide enhanced interactivity to distance learning systems via affordable and cost effective mechanisms which use existing transmission infrastructure.

It is an object of the invention to remember earlier student selections in tailoring personalized audio instruction.

It is an object of the invention to provide a return path in real time or later so that the teacher receives statistical performance information.

It is an object of the invention to use an analog transmission means for imbedding multiple interactive audio signals and data codes onto a single video signal.

It is an object of the invention to use digital transmission technology for combining multiple interactive audio signals, a video signal and data codes onto a single composite digital interactive video signal.

It is an object of the invention to provide a learning environment with a live instructor allowing for individualized instruction to students directly or through alternatively recorded video or audio on separate channels.

It is an object of the invention to provide the capability to switch between a video focused on the instructor to a graphics video displaying interrogatory messages and different audio messages relating to different answer selections.

These and other advantages, features and objectives of the invention and the manner of attaining them will become apparent and the invention will be best understood by reference to the following description of the embodiments of the invention in conjunction with the accompanying drawings and appended claims.

DETAILED DESCRIPTION OF THE PREFERRED EMBODIMENT

I. Introduction

The present invention is a direct learning system 98 for enabling a complete interactive television program to be transmitted or recorded as a single NTSC compatible television signal and be received at multiple classroom locations to provide students with interactive and individualized learning experiences. The interactive television programming used herein preferably comprises a single video signal with a plurality of audio signals, preferably four or more, which are related in time and content to one another. The interaction with the students comes via the plurality of audio channels. Audio segments are used to provide personalized responses to student selections. The interactive television program may also comprise data for controlling an interactive television program controller 178 at the classroom location.

II. System Components

A. General Overview

Figure 1:
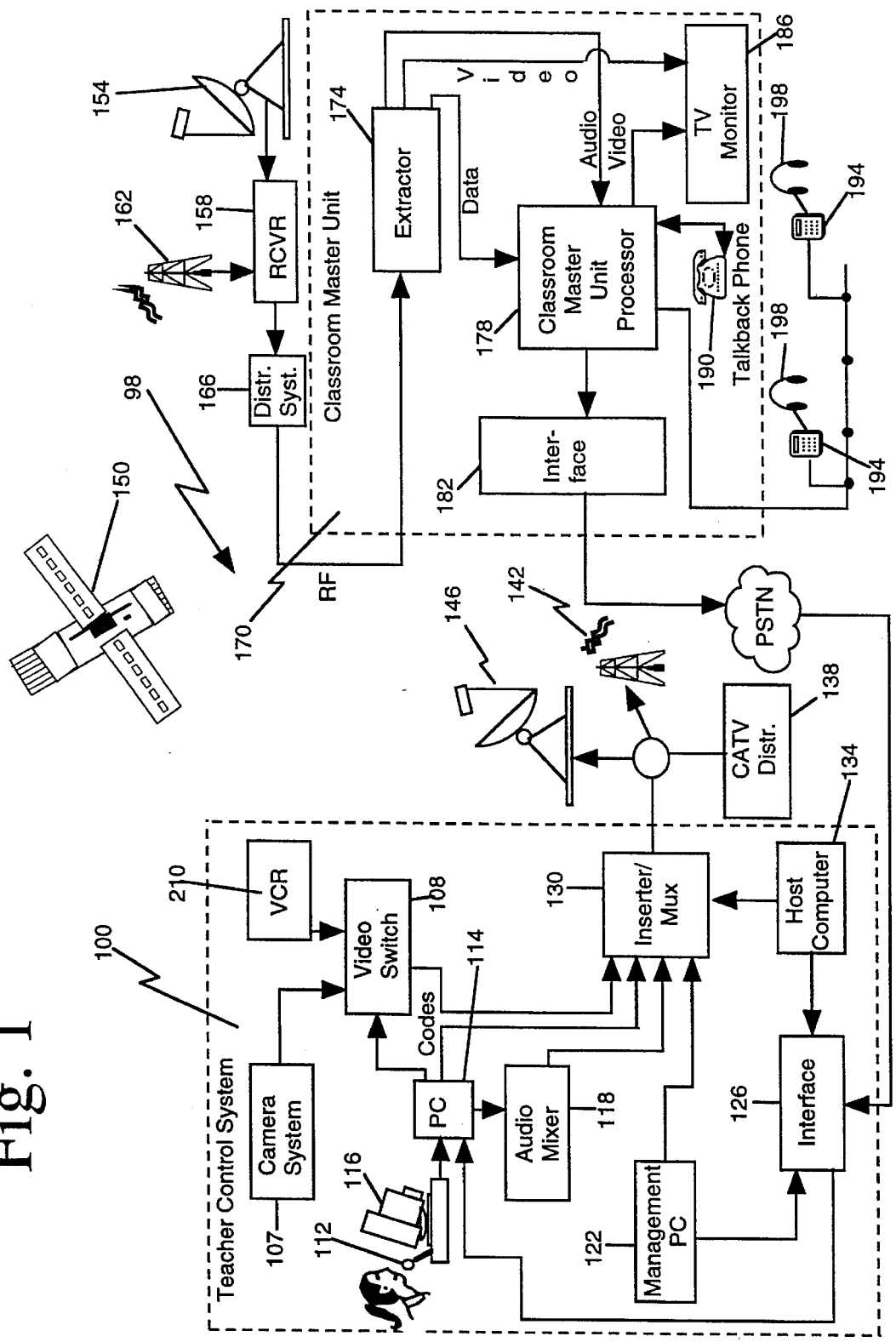
FIG. 1 is a diagrammatic representation of the distance learning system displaying various elements of the system.

As shown in FIG. 1, the system uses an interactive program delivery system 98 with any video transmission means including satellite 150, cable 138 or broadcast television 142 to deliver the interactive program for distribution to the multiple classroom sites. Likewise, distribution of the signal at the receive end can be by any suitable transmission means 166 including a cable distribution system, fiber optic, microwave, etc. In the preferred embodiment, the system generally includes: a teacher control unit 100 where a video signal, audio channels and control codes are preferably created and assembled into a standard NTSC compatible video signal; a broadcast transmission system comprising transmission equipment for transmitting the interactive video signal by any suitable broadcast transmission means and receive equipment for distribution to multiple classroom sites; the multiple classroom sites comprising a classroom master unit 170 and connected keypads 194 for receiving the audio channels; and a television monitor 186 for displaying the video signal.

B. The Teacher Control Unit

Figure 2:
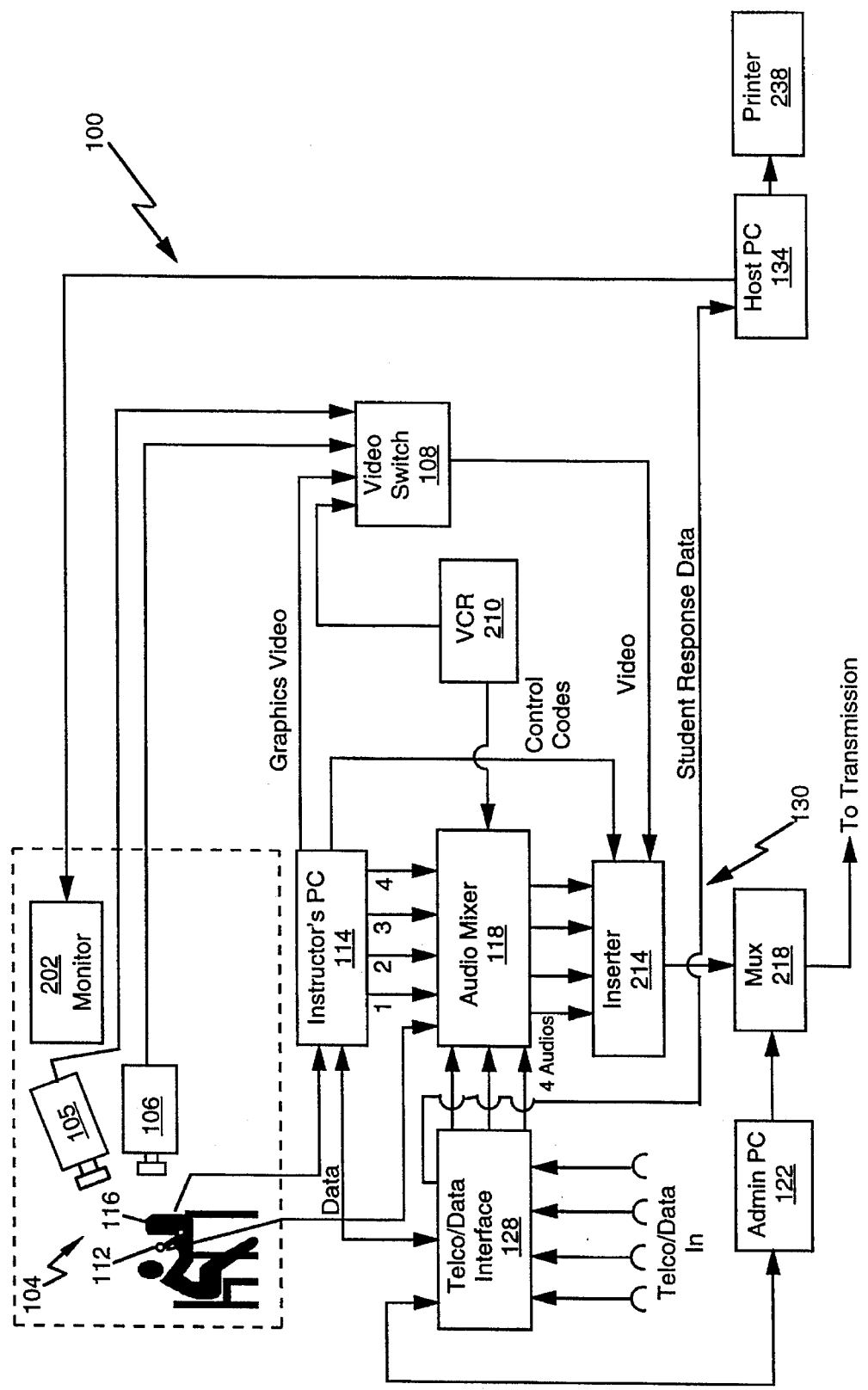
FIG. 2 is a block diagram of the components of the teacher control unit located at the headend of the distance learning system.
Figure 9:
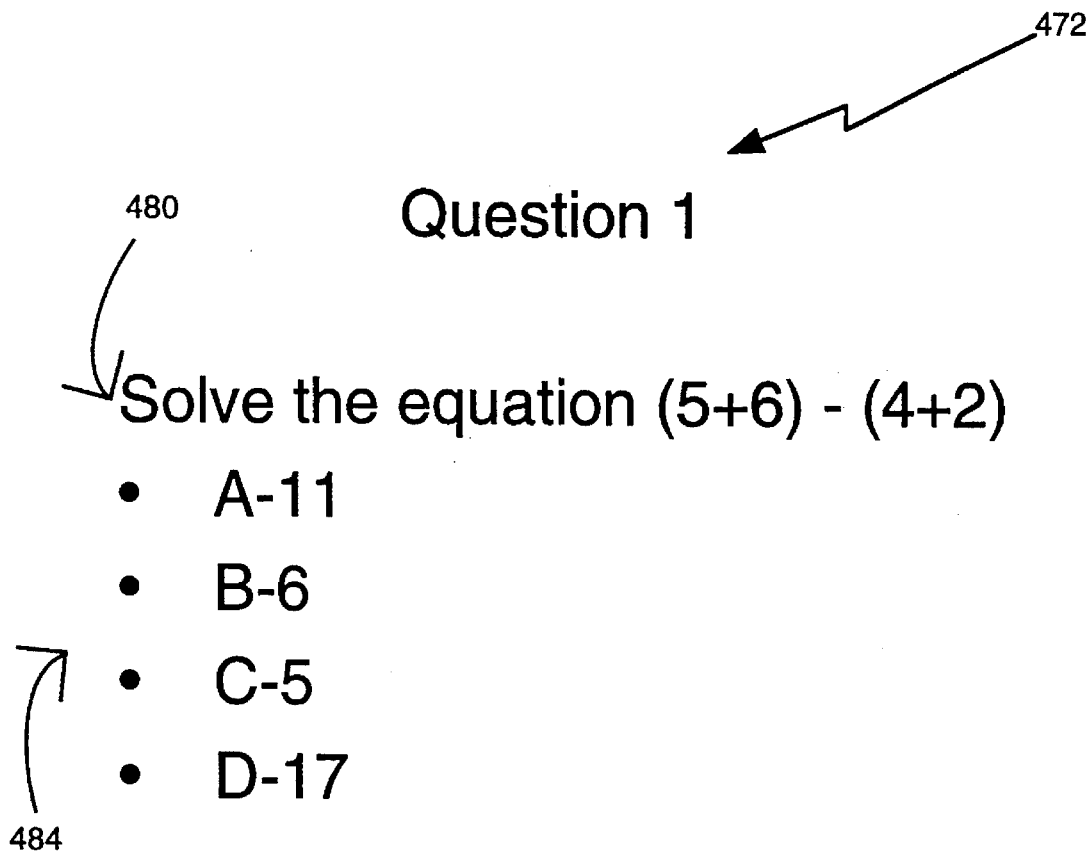
FIG. 9 is an example representation of a graphics interrogatory message displayed on the video monitor at each of the classroom locations.
Figure 10:
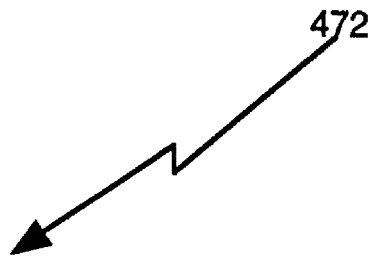
FIG. 10 is an example representation of a graphics answer slide corresponding to the graphics interrogatory message in FIG. 9.

The teacher control unit 100 is at the centralized location, or host, which comprises a studio for live video broadcast of an instructor's presentation. As shown in FIG. 2, the instructor utilizes a personal computer 114 to create interactive programming consisting of graphics interrogatory messages 480 shown in FIG. 9 and FIG. 10, with correct and incorrect answers 484 shown in FIG. 9 and FIG. 10, overlaid on the video, a plurality of audio tracks recorded in the instructor's own voice corresponding to correct and incorrect answer choices of the interrogatory messages, and data codes necessary for controlling the interactive program elements. Preferably, the audio tracks and data codes are inserted into the vertical blanking interval of the video signal for transmission. In an alternative embodiment, the plurality of audio tracks, data codes and video signal are digitized and combined into a composite digital signal, as described below. The teacher control unit 100 comprises a host personal computer 134 that tallies student responses received from the classroom sites and can immediately project the evaluation results onto a monitor 202 shown in FIG. 2, for the instructor. An administrative computer 122 communicates with the remote sites for student response data and performs system diagnostic checking.

The interactive broadcast program is prepared at the teacher control unit 100. The teacher control unit 100, as shown in FIG. 2, allows a teacher to create and introduce interactive elements during a live broadcast. One or more cameras 104, preferably an overhead camera 105 and a normal camera 106, are used for generating the video of the live instructor. The cameras 104 are focused on the instructor. The camera's outputs are directed to a video switch 108 that also receives video inputs from the instructor's personal computer 114 and from a standard VCR or CD 210.

In one preferred embodiment, the teacher pre-records all of the right answers and wrong answers, as well as standard messages, into the personal computer 114 before the program begins. The program then starts and the teacher presents his or her material live. When it's time for the interactions, the teacher picks a question, as described below, and pre-recorded audio responses, which may be composed of a single or combination of multiple audio tracks (live or prestored), can be presented as a function of student selection.

In an alternative embodiment, a distance learning presentation can be created live with two teachers. Each teacher switches back and forth while presenting their material, then both share in posing questions to the students. The two teachers can alternate giving either the audio branch for a correct answer, or the audio branch for the wrong answer. Although not shown in FIG. 2, in this embodiment the two separate audio branches are transferred simultaneously into the voice mixer 118. When the teachers give the branches, each teacher must be in a separate sound proof area so that one teacher's audio does not "bleed" into the other teacher's audio.

In the preferred embodiment, primary preparation of the question-and-answer portion of the interactive program preferably occurs off-line on the instructor's computer 114. The instructor's computer 114, shown in FIG. 2, is preferably a multimedia personal computer which could be a Macintosh, Sun, IBM, Power PC, or compatible, computer.

The Program creation software on the instructor's personal computer 114 allows the scripting of presentation aids. The scripted presentation aids are stored in files in ROM in the instructor's computer 114. The presentation aids are available to assist the instructor during broadcast. Presentation aids may include instructor agenda lists and formatted questions, previously prepared, that can be viewed by the audience.

The formatted questions may include multiple choice questions, TRUE/FALSE questions, YES/NO questions, direct value entry, and the like, that are broadcast as part of the interactive video signal. The instructor creates graphic slides of questions on the computer 114 using the text editor. Associated with each question, the instructor enters a number of possible participant options for answering the questions. The instructor records into a microphone 112 a verbal explanation for each of the possible answer choices. These audio responses can later be combined with an appended standard response at the handsets 194 shown in FIG. 1. The instructor should keep each of the four audio responses near the same length in time. This will avoid the possibility of dead time after an audio response is played to the student since the branch back to the lecture audio (channel one) preferably will occur simultaneously in all remotes 194 shown in FIG. 1. The software automatically formats the text into visually pleasing television graphics and associates the multiple audio tracks corresponding to the instructor's verbal responses with the particular graphics segment.

Each graphics question and the corresponding audio responses are preferably stored in a relational database. The multiple audio response segments are stored in separate files. The graphics element, multiple audio tracks ready for broadcast, and data codes are preferably related to one another in the relational database by pointers. The process for creating the graphics interactive program files, described above, is repeated for each interrogatory message thereby creating a database of related files.

The file is preferably represented to the instructor via the computer monitor 116 shown in FIG. 1, in the form of a PICON. A PICON is a picture icon which represents a file. The instructor can view an entire set of relevant PICONS on the display monitor 116 while proceeding with a lecture. When the teacher is ready to query the students regarding a certain aspect of the lecture, the teacher can dick on or touch a PICON which first sends and displays the graphics and then at the appropriate time effectuates the transmission to the audience of the four audio response tracks. Preferably, the audio is sent when the instructor enters a command which is received by the processor and the four appropriate audio responses are retrieved from memory and are input into one of four ASIC chips. At the appropriate time, the audio is read from the instructor's computer and is transported to the audio mixer 118.

Alternatively, a pre-recorded interactive distance learning program can also be accomplished easily with the present invention. The interactive program can be created like any television program. It can be developed in whatever format is available, tape or disk, analog or digital, including but not limited to: one inch, D1, D2, Betacam, Betacam SP, Hi-8, three-quarter, S-VHS, or any other format.

The interactive program used in the present invention preferably comprises a single video with a plurality of audio signals embedded therein to achieve interactivity. The video switch 108, shown in FIG. 2, selects video from either the graphics video received from the instructor's computer 114, the live broadcast video received from the cameras 104, recorded video from a VCR 210, or a graphic from the computer keyed over another video. The video switch selection depends on the particular command instructions received from the computer processor. If the instructor is broadcasting a live lecture to the classrooms, the processor will send a command to the switch 108 to output the camera-based video. The instructor may send a digital signal from the instructor's computer to the remote terminal instructing the terminal to overlay generated text onto the video. If, however, the instructor desires to send formatted interrogatory messages to students, a command is sent from the processor to the switch 108 to switch from the live broadcast video to graphics video. Similarly, a pre-recorded interactive video program could be sent from a VCR 210 for subsequent output selection by the video switch 108.

Timing and control between the video and multiple audio elements, discussed above, are provided through the use of data codes. The data codes are stored in memory in the instructor's personal computer 114 as part of the ACTV programming language. The codes comprise commands, or branch codes, for branching between channels (as discussed in the aforementioned ACTV patents and applications), timing signals for controlling the interactive program, data or text, commands for termination and initiation of interactive programming viewing, or triggers for executing macros. The data codes are output from the computer 114 to the inserter 214, shown in FIG. 2.

The output of the video switch 108 then passes to the inserter 214 to be combined with the data codes and multiple audio channels. As shown in FIG. 2, the audio channels are fed from the instructor's personal computer 114 into an audio mixer 118. Either in the personal computer 114 or voice mixer 118, the audio channels can be compressed, expanded and/or limited to achieve a higher signal-to-noise (S/N) ratio at the receiver 158 shown in FIG. 1. Furthermore, this processing can be utilized to align the different audio response tracks in time. The audio mixer 118 also has the capability of receiving, via an interface 128 with the telephone system, return audio from the participants in the classroom locations. In addition, VCR audio output is received by the audio mixer 118. The audio mixer 118 preferably outputs four audio channels; however, the present invention can accommodate any other number of audio channels.

Figure 3:
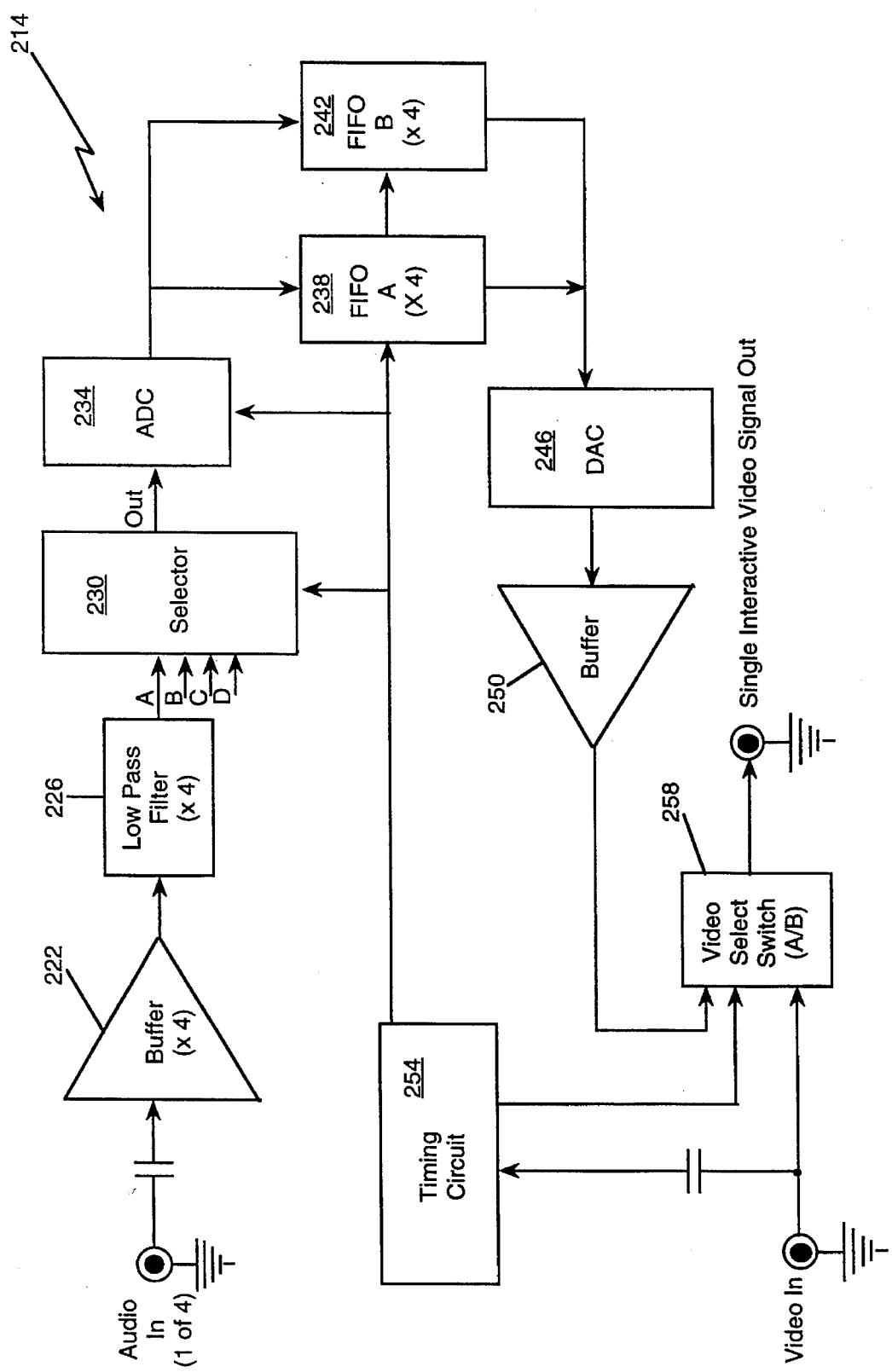
FIG. 3 is a diagram showing the hardware elements of the preferred analog transmission embodiment at the headend comprising an inserter for embedding four audio circuits and data commands into a single video signal.

The analog inserter 214 of the preferred embodiment is shown in more detail in FIG. 3. The four audio output channels are fed into the inserter 214 to be mixed with the video and data. Each audio signal is preferably an analog signal which varies between −1.0 and +1.0 V. A buffer 222 is provided for each audio signal to electrically isolate the audio inserter 214 from the source of the audio signals. The buffer 222 preferably comprises an RC circuit which feeds an operational amplifier. The amplifier in the buffer 222 preferably raises the absolute voltage level of the audio signal by +1 volt so that the audio signal will have a range from 0 V to +2 V, and then amplifies the audio signal so that its range is from 0 V to +5 V. This converts the analog audio signals to a format which is fully compatible with the analog-to-digital (A/D) converter 234 discussed below.

The output of each buffer 222 is directed to a bank of low pass filters 226, one for each audio signal. In addition to reducing high frequency noise from the audio signal, the low pass filter 226 clips the audio signal to a desired frequency. The frequency to which the input is clipped depends on the number of lines of video the particular audio channel is to occupy. The filtered audio output signals of the low pass filters 226 are directed as inputs to a multiplexer 230.

In the preferred embodiment, the multiplexer 230 is preferably a conventional four-input one-output multiplexer 230 which is controlled by timing signals received from the timing circuit 254. The timing circuit 254 is synchronized with the video signal of the interactive program and controls the multiplexer 230 to sequentially take a sample from each audio signal and to direct the sample to an analog-to-digital (A/D) converter 234. The A/D converter 234 converts the samples of the four audio signals to an 8-bit digital format.

As shown in FIG. 3, each of the four audio channels preferably has an associated first-in first-out (FIFO) pair 238, 242. The 8-bit digital samples for each signal are directed as an input to one of the FIFO pair 238, 242 associated with that signal. The samples for each channel are preferably directed to one of the FIFO pair 238, 242 for that channel until enough samples are in that FIFO to fill the desired number of lines of the video field into which the sampled audio is to be inserted. The audio samples are then directed to the other FIFO of the FIFO pair 238, 242 for that channel until that FIFO has the correct number of samples. In the meantime, the contents of the first FIFO are written onto the video signal. It is foreseen that other types of memory means may replace the FIFO pair 238, 242.

When the content of a particular FIFO is to be inserted into the video, the digitized audio samples stored in that FIFO are directed (first-in-first-out) to a digital- to-analog (D/A) converter 246, as shown in FIG. 3. The D/A converter 246 converts the stream of digitized audio samples into an analog PAM (pulse amplitude modulated) signal. A second buffer 250 is provided for electrically isolating the inserter circuit from the switching circuitry 258 which multiplexes the audio signals into the video signal.

In the preferred embodiment, the audio signals A and B are each inserted independently onto 5 lines of one field of the video signal, and audio signals C and D are inserted independently onto 5 lines of the other field of the video signal. In order to enable continuous audio playback for each channel, the audio for each channel must be compressed so that 5 lines of video per frame contain enough audio content for the playback time of one frame of video (about 1/30th of a second).

The number of samples of audio required for each channel depends upon the desired sound quality. If lower sound quality is desired, fewer lines of video may be used, and vice versa.

In the preferred embodiment five (5) lines of video are used per frame per channel of audio, with 105 samples per line at a sampling rate of 15,734 samples per second. The multiplexor 230 sequentially samples each audio signal 15,734 times per second and alternatively directs 525 samples to each of the FIFO's 238, 242 associated with each audio channel. At a predetermined time before the audio from each channel is to be inserted into the video signal, the timing circuit 254, shown in FIG. 3, instructs the full first-in first-out FIFO for the channel to write the digital audio to the D/A converter 246 which converts it to a pulse amplitude modulation (PAM) signal. The timing circuit 254 then switches the video selector 258 to receive the PAM audio signal through the buffer 250 as an input in lieu of the video signal. In this manner, the audio channels are inserted into the video. Once the audio has been inserted into the video at the desired location, the timing circuit 254 commands the video select switch 258 to change its input back to the video signal. This process is repeated for each audio signal at the video lines that audio signal is to be inserted into the video signal.

Typically, ten lines of the Vertical Blanking Interval (VBI) of the video signal are available for use in each field of video. In the preferred embodiment, for each frame of video, audio signals A and B are each inserted as five lines of the VBI of one field, and audio signals C and D are each inserted as five lines of the VBI of the other field.

In the preferred embodiment, data is preferably sent on line 21 of the vertical blanking interval (VBI) using the predefined standard for transmitting data on line 21. The line 21 data is preferably sent as 16 bits of serial data per field, and is placed into the video signal using a standard line 21 encoder. However, the data can alternatively be inserted into other lines of the video. Classroom site codes are preferably placed in line 22 and would similarly preferably be sent as 16 bits of serial data per field.

The PAM samples may also be randomly dispersed within the video frames. A control algorithm distributes the random PAM samples in the video using a rule of distribution. The rule of distribution minimizes any degradation in the perceived quality of the video. For example, it is not desirable for the samples to be too closely grouped together, especially in successive fields of frames. A header may be placed on the random audio samples to enable the audio extraction system 174 to identify the audio samples.

If the VBI is being used for other purposes, the audio signals may be inserted over lines of active video, for example, at the top and bottom of each field. Fewer video lines may be used if lower quality audio is desired, or more lines used if additional audio channels are desired.

Several additional audio signals may be transmitted along with the interactive video signal in other ways. An audio signal may be transmitted over each of the normal audio channels. The audio may be distributed in many ways using the available audio channels. For example, high quality background music for the interactive program could be transmitted over the normal audio channel. Then, lower quality audio for voice-overs could be inserted onto the video signal and/or using the secondary audio program (SAP) signal. This would enable a larger number of audio signals to be transmitted with the interactive program. In addition, the audio channels could also simply be combined with the video and data signals via a frequency division multiplexer. The audio channels can be digitized using any common analog-to-digital conversion technique such as PCM, DM, ADPCM, etc. Finally, vocoders (e.g., LPC, APC, channel vocoders) can be employed to reduce the required data rates and bandwidth requirements for transmitting voice.

Thus, there are many variations in which the present invention may be used to facilitate the transmission of multiple audio channels. In one possible alternative embodiment, instead of embedding the plurality of audio channels in the video signal, the channels are all sent as one audio signal using serial sequencing. Serial sequencing is defined by reading the audio tracks from memory serially in sequence (i.e., A1, then A2, then A3, etc.). The resulting signal is then sent as a secondary channel, or SAP channel, with the primary channel containing the regular audio of the live instructor's voice. In this embodiment, these particular audio tracks would have to be sent prior to the time when the answers are scheduled to be played to the students. Therefore, when the SAP channel is received at the classroom master unit or unit in the home 170, the signals will be independently decoded from the SAP channel, buffered and stored in memory 284 for later use when it is appropriate to playback the answers to the students.

Alternatively, the distance learning system of the present invention can provide for transmission of the interactive signal by digital transmission means, resulting in reduced bandwidth requirements. In the digital transmission embodiment the interactive signal can be transmitted by not only satellite but ATM, Sonet, T1 or any other digital transmission system.

Figure 4:
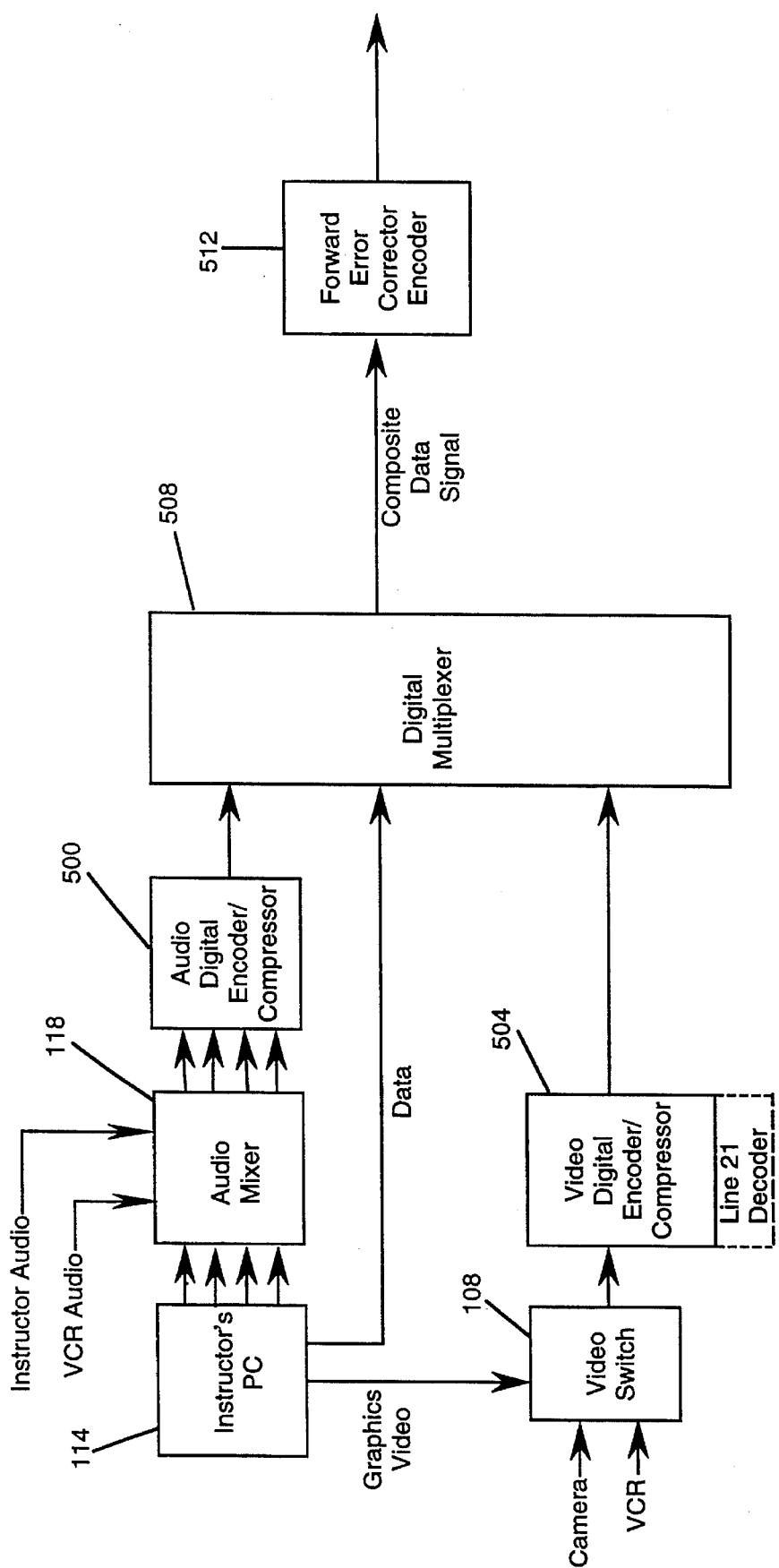
FIG. 4 is a block diagram showing the hardware elements of a digital transmission embodiment comprising digital encoder/compressor configurations and a digital multiplexer.

The digital transmission components at the teacher control unit 100 are shown in FIG. 4. As shown in FIG. 4, the plurality of audio signals are output from the instructor's personal computer 114 and mixed in the audio mixer 118 with the live instructor's audio and VCR audio, preferably resulting in four output channels. The audio signals are then preferably sampled, encoded and compressed in the audio digital encoder/compressor 500. The encoding technique can be a waveform coding technique such as PCM, ADPCM or DM. Alternatively, the signals can be encoded using synthesizer or vocoder techniques such as MUSICAM, Linear Predictive Coding (LPC), Adaptive Predictive Coding (APC), and Sub-band coding. A single composite audio signal is output from the audio digital encoder/compressor 500.

As shown in FIG. 4, the video signals from the cameras 104, graphics video from the instructor's personal computer 114, and video from the VCR 210 are input into the video switch 108 which outputs one of the video signals. The video digital encoder/compressor 504 takes the video signal, encodes and compresses the signal according to a known standard such as MPEG-1, MPEG-2, JPEG, or other DCT based coding scheme, wavelets, fractals or other transform based approaches. Alternatively, the video digital encoder/compressor 504, shown in FIG. 4, could utilize a waveform based technique, such as PCM, ADPCM, or DM, for encoding and compressing the video signal.

The data from the instructor's personal computer 114, in FIG. 4, is preferably compressed in a board in the computer 114 and delivered directly to the digital multiplexer 508. The digitized data, video and audio signals are delivered to the digital multiplexer 508 where the signals are buffered and combined via time division multiplexing, with appropriate synchronization signals applied, to form a composite sync serial data stream. At the output of the digital multiplexer 508, forward error correction (FEC), the code depending on the selected transmission path, is applied by an FEC encoder 512. The composite interactive digital signal is then transmitted to the receivers 158 using a suitable transmission means such as satellite, fiber optic, DS, etc.

Referring back to the teacher control unit 100 in FIG. 2, the administrative personal computer 122 preferably polls remote sites for student response data, and includes software for performing diagnostic checking on the system. Special polling software is loaded into the administrative computer 122 for performing the polling functions. While in the preferred embodiment the administrative computer 122 polls the classroom master units 170 for student response data, the invention also alternatively allows for the classroom master units 170 to send back data at periodic times without the requirement of a polling command from the head-end administrative computer 122. In addition, the administrative computer 122 transmits site/user authorization, or billing codes, to all the classroom master units 170.

As shown in FIG. 2, the host computer 134 receives the student response data, processes the data and displays the processed data on a monitor 202. The computer 134 contains software for processing the student responses including tallying responses, grouping scores by class, determining percentage of questions correct, etc. The software is capable of organizing data in bar graph or chart form. These graphs and charts can be displayed on a monitor 202 to the instructor so that the instructor can use such information for assessing student and classroom site performance.

In the preferred embodiment, the host and administrative computers 134,122 preferably use Intel 486 based processors. Student response data and other data from the remote classroom master units 170 is preferably received by the host computer 134 from telco/data interface 128 if the PSTN is used for return information. The telco/data interface 128 can manage a multiple number of incoming calls at once. The telco/data interface 128 route audio to the audio mixer 118, student response data to the host computer 134, with control and diagnostic data directed to the administrative computer 122. While in the preferred embodiment the respective functions of program preparation, diagnostic checking, polling and site authorization, and receipt and processing of student response data are performed on separate computers, the functions could be combined and performed on one or two computers.

Administrative computer 122 messages are transmitted to the classroom locations after being multiplexed with the interactive video signal in the teacher control unit multiplexer 218. Alternatively, the administrative data could be inserted into the video signal using the inserter 214 in the preferred embodiment or multiplexed into the composite digital stream in the digital embodiment.

In summary, the teacher control unit 100 creates and transmits an interactive video signal by taking video from cameras 104, graphics from the instructor's computer 114, or prerecorded video from a VCR 210, inserting multiple audio channels and data codes, and transmitting the resulting interactive video signal to the transmission system. The teacher control unit 100 also retrieves student performance and administrative information from the remote classroom sites for aiding the instructor.

C. The Transmission System

As shown in FIG. 1, the system uses an interactive program delivery system 98 with any video transmission means including satellite 150, cable 138 or broadcast television 142 to deliver the interactive program for distribution to the multiple classroom sites. Likewise, distribution of the signal at the receive end can be by any suitable transmission means 166 including a cable distribution system, fiber optic, etc. In a satellite broadcast transmission 150, the interactive video signal is transmitted to uplink equipment 146 where it may be multiplexed, upconverted, modulated, amplified and transmitted by satellite 150 to a receiver site 154 for distribution to the classroom locations. In the analog environment, the interactive video signal enters an analog receiver 158 and then preferably a distribution system 166 that directs the signal to classroom locations. In the alternative digital embodiment, the composite digital interactive signal enters a receiver 158 where it is demodulated and then preferably passed to a digital cable distribution system that directs the signal to the classroom locations. Although a cable distribution system 166 is the preferred transmission media to the remote sites, the interactive video signal may also be distributed by any conventionally known technique, such as DBS, fiberoptics, low or high power broadcast television, telephone lines, cellular networks, and similar technology can be used interchangeably with this program delivery system. In addition, the interactive video signal could also be recorded on tape at the teacher control unit 100 and played back at the classroom sites.

D. The Classroom Master Unit

Figure 5:
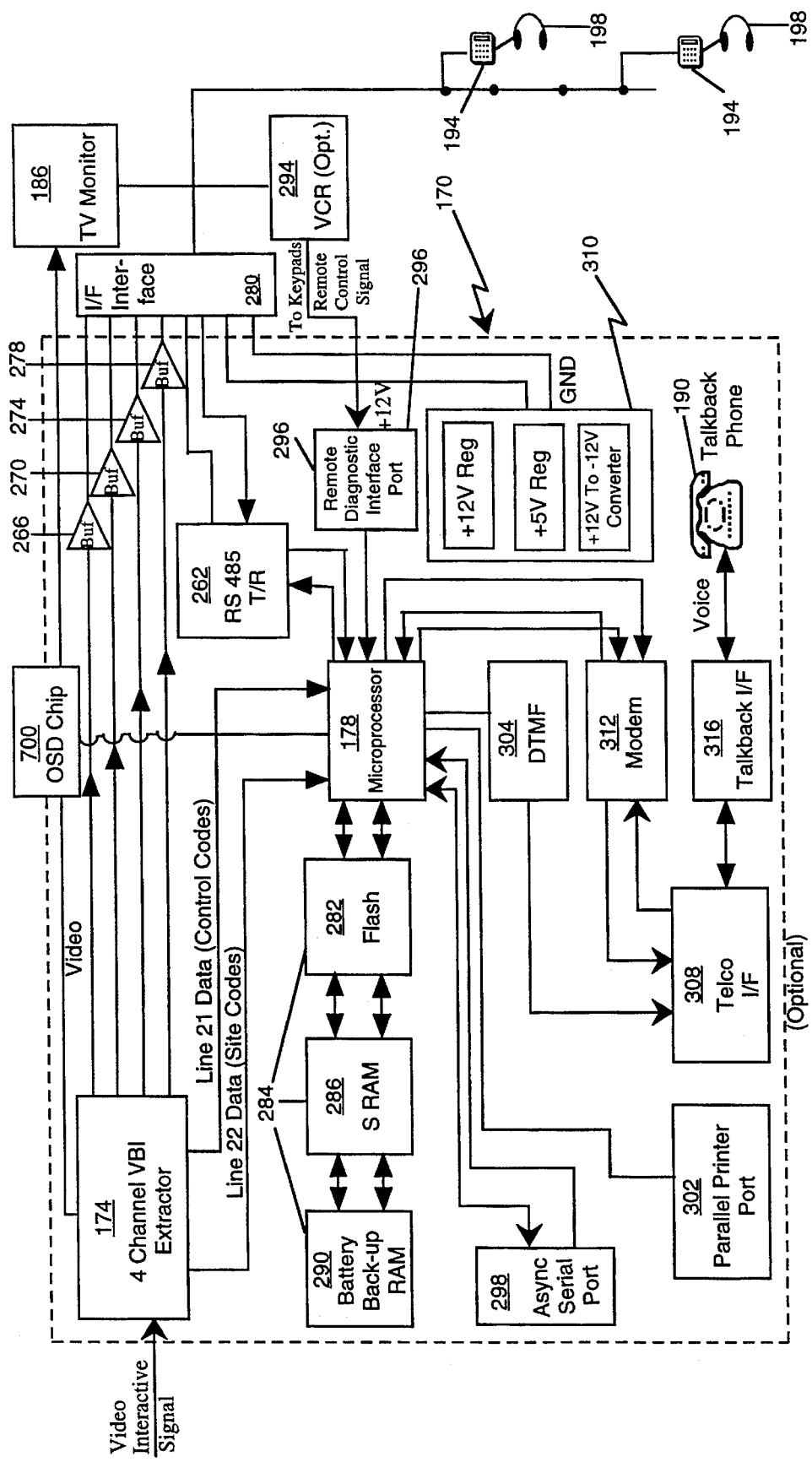
FIG. 5 is a block diagram of the components of the classroom master unit resident at each remote classroom location.

As shown in FIG. 5, the classroom master unit 170 comprises an extractor 174, a controller 178 with associated memory 284, VCR (optional) 294, modem 312, interfaces to a printer 302 and return paths 308,316 back to the headend, and an interface 280 for the subscriber handsets 194.

Figure 6:
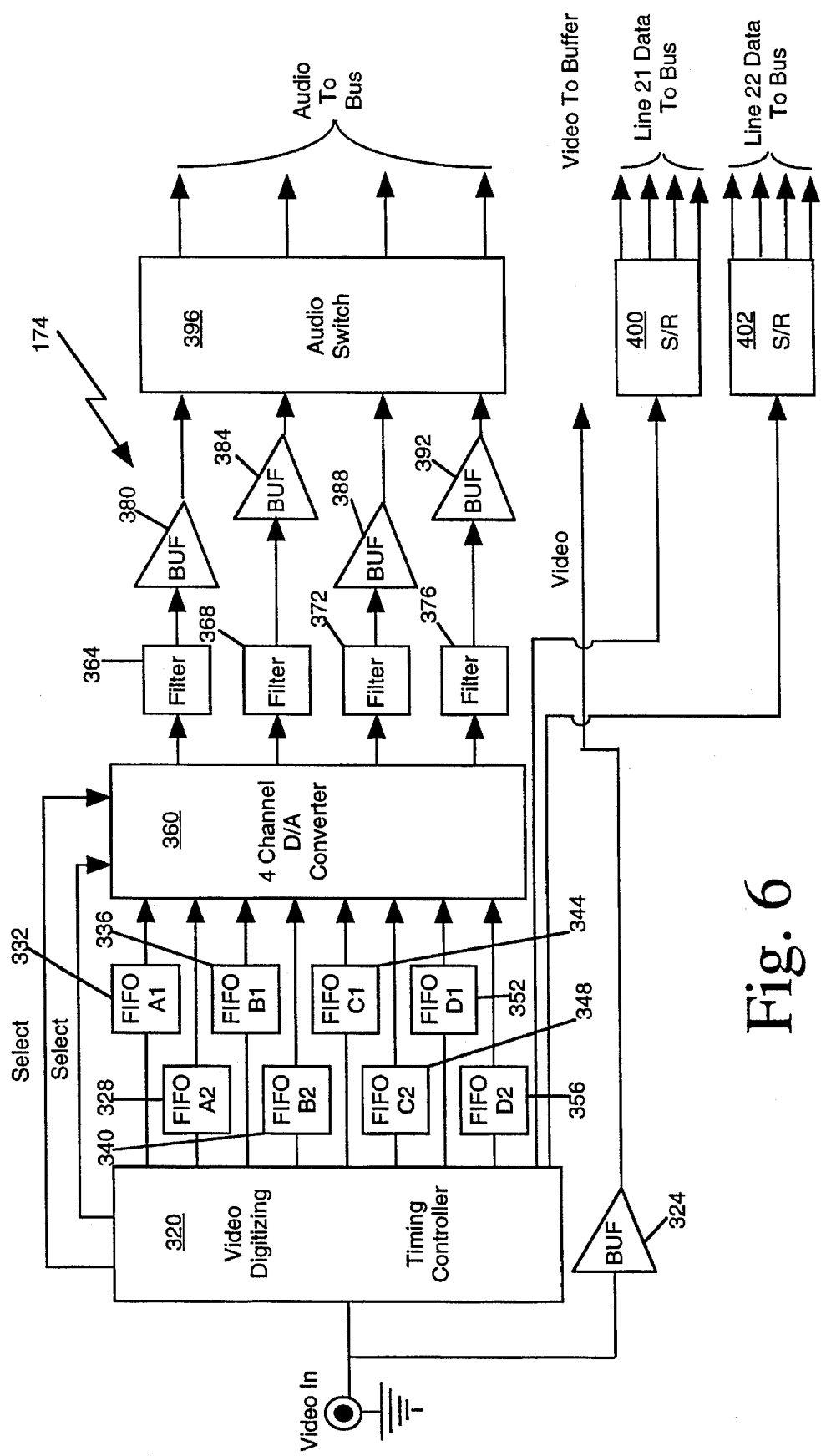
FIG. 6 is a detailed schematic of the hardware elements of the preferred analog embodiment four-channel VBI extractor.

In the preferred embodiment, the signal is demodulated and passes to a multichannel audio VBI extractor 174, as shown in FIG. 6. The audio and data is stripped out of the baseband signal in the four-channel VBI extractor 174. The signal separator 174 essentially reverses the process by which the audio and data signals were inserted into the video signal. A video digitizing system and timing controller 320 digitizes the incoming video signal at the same sampling rate at which the PAM audio samples were inserted into the video signal. While the system 174 preferably digitizes the entire video signal and extracts only the audio signals from the digitized video, it may be preferred to only digitize those lines of the video signal which contain the audio signals.

The timing controller 320, shown in FIG. 6, determines which lines of video contain the audio signals and separates the compressed audio signals by directing each audio channel into an associated FIFO pair 328–356. As with the insertion circuit, the FIFO's in the FIFO pairs 328–356 are used alternately so that while one FIFO is reading the audio data, the other is writing data. The digital-to-analog (D/A) converter 360 sequentially reads from the FIFO for each channel which is in the write mode and converts the digital signal for that channel into an audio signal. The analog output for each channel is filtered by filters 364–376 and directed to buffers 380–392. The buffers 380–392 preferably adjust and amplify the analog output signals to −1 V to +1 V range. The four output audio signals correspond with the four audio input channels.

As shown in FIG. 6, the line 21 data is read into 8-bit shift registers 400 wherein the 16 bits of serial data are converted to two bytes of data. The line 22 data is read by 8-bit shift registers 402 and the 16 bits of serial data are also converted to two bytes of data.

The line 21 and 22 data (i.e., the data codes) are directed from the extractor 174 into the controller 178 shown in FIG. 5, at the classroom master unit 170. The master unit controller 178 shown in FIG. 5, decodes the data and stores it in either RAM 286 or FLASH memory 282.

Figure 7A:
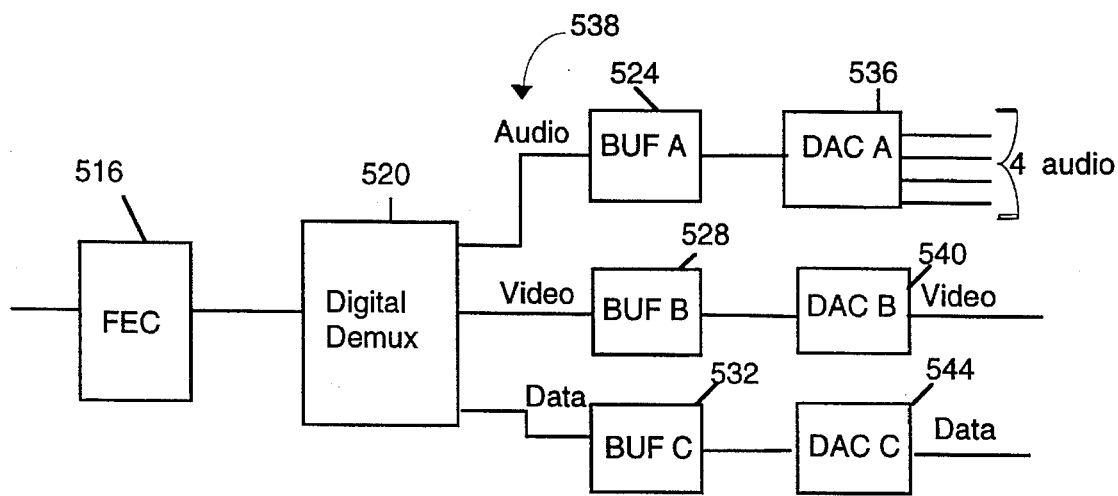
FIGS. 7(a) and 7(b) are block diagrams of the digital transmission components at the receive locations comprising a digital decoder/demultiplexer configuration and NTSC inserter, respectively.

In the alternative digital embodiment at the receive end, the composite digital signal is received where the forward error correction (FEC) code is decoded by an FEC decoder 516, as shown in FIG. 7a. The resulting signal is forwarded to a digital demultiplexer 520 where the audio, data and video components are separated and individually buffered in a set of buffers 524–532. From buffer A 524, the composite digital audio signal enters a digital-to-analog converter 536 where the four audio signals are separated, decoded and decompressed to recreate the four separate analog audio channels. From buffer B 528, the digital video signal similarly enters a digital-to-analog converter 540 where the signal is decompressed and decoded to form an analog video signal. The data is similarly decompressed and decoded in analog-to digital decoder C 544.

Figure 7B:
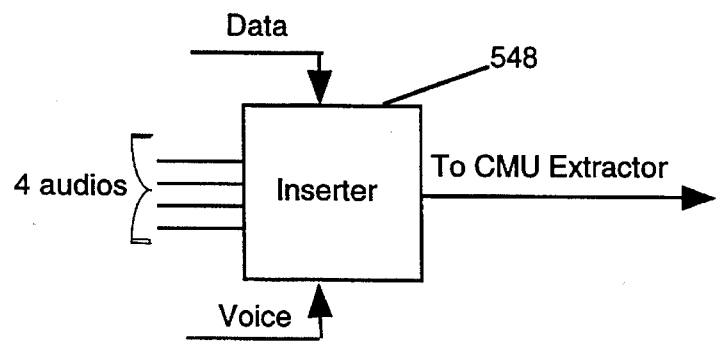

In the digital embodiment, if the demultiplexer configuration 538 is located at the same site as the classroom master unit 170, the plurality of analog audio channels, data and video signal are preferably connected to the master unit 170 by direct wire cable. In this embodiment, the plurality of audio signals, data and video signal simply bypass the 4 channel VBI extractor 174, shown in FIG. 5, and are forwarded to the keypads 194, controller 178 and monitor 186, respectively. However, if the signals are to be redistributed to several classroom locations and/or recorded, the four audio signals and data signals are embedded into the video signal in the inserter 548, shown in FIG. 7b, to form a standard NTSC interactive video signal. This inserter 548 is physically and functionally identical to the inserter 214 used in the analog embodiment at the head-end. The embedded signal is then sent from the output of the inserter 548 to the 4 channel VBI extractor 174 shown in FIG. 5.

If the digital signal delivered to the home or to a single user digital converter box, the Functions of the master unit and/or keypad can be incorporated into one digital set top converter box using existing hardware and software and ACTV program codes. The user interfaces with the converter using the converter remote control. The converter digital circuitry selects From the incoming digital audio streams the appropriate audio channel and delivers it to either the television speaker or attached headphones.

The master unit processor 178, as shown in FIG. 5, receives data From the VBI extractor 174, stores data and reads instructions From FLASH 282, SRAM 286 and Battery backup RAM 290 memory, sends instructions and receives response data From the keypads 194 via the RS-485 transceiver 262, interfaces to a printer via a parallel printer port 302, and interfaces with return paths via a telco interface 308. The processor 178 also preferably interfaces with a power module 310 going to a wall transformer. It connects to the teacher control unit 100 at the head end via either dial-up telephone lines or passes data back and Forth via a public X.25 packet network. The processor 178 is preferably a 80C188 based microcontroller, but can be any similar controller.

The classroom master unit processor 178 Functions as a site controller. The processor 178 provides For site setup, drives software For scoring students, transmits commands to keypads 194, transmits/receives data From keypads 194, and handles remote diagnostics. System setup and polling Functions are controlled by instructions sent in the data From the headend 100 and received by the controller 178. The instructions may be stored in one of three portions of memory 284. If the instructions are used frequently and over a long period of time, long term memory such as FLASH 282 memory is preferably used. If the instruction commands pertain solely to the current interactive program received at the site, these commands are preferably stored in SRAM 286 or the battery backup RAM 290.

The functions of the classroom master unit can be incorporated into the cable headend, school headend or set top converter box.

The program data codes generated by the teacher control unit 100 are necessary for presenting the interactive program. As mentioned above, the data includes branch codes containing branching commands and algorithms, timing signals for controlling the interactive program, management and administrative data, and also triggers for executing macros at the master unit processor 178.

In the setup initiation procedure with the teacher control unit 100, the classroom master unit 170 sites are instructed how to link to the headend 100. The administrative computer 122 transmits commands which provide for interactive program setup and for establishing return paths to the headend 100. These instructions are preferably stored in the battery backup RAM 290 associated with the classroom master unit controller 178. The parameters instruct the remote sites how to access the public switch telephone network, Internet, or any similar network for access back to the headend 100.

The operating system for the controller 178 is preferably stored in FLASH memory 282. The FLASH memory 282, as shown in FIG. 5, also preferably stores new instructions from the headend teacher control unit 100 to use with reprogrammable software. It works in conjunction with RAM 286 and battery backup RAM 290. The battery backup RAM 290 preferably saves the configurations, the authorizations from the teacher control system 100, and other information transmitted on line 22 of the video signal. The battery backup RAM 290 can also be used as an interface to a print buffer. The print buffer is used so that data transmissions to the site can be buffered, error corrected and formatted for printing. Data transmission can include newsletters, course related materials and schedule updates.

The site controller 178 can be connected to an on-screen display chip 700 which overlays the incoming video with video characters received from the teacher control unit or site setup, diagnostics, etc.

The site controller 178 is preferably connected to a printer via the parallel printer port 302. The controller 178 sends student scores to the printer.

Voice communications back to the teacher control unit 100 can occur by way of the talk-back phone 190, which is interfaced to the public switch telephone network via the telco interface unit 308, as shown in FIG. 5.

A remote diagnostic system 296, shown in FIG. 5, at the classroom master unit 170 allows for remote turn-on and turn-off of television monitor(s) 186 and also includes an indication of the status of the television monitor(s) 186.

The classroom master unit 170 connects with the keypads 194 either by cable 404 in a daisy chain configuration or by infrared (IF) connection. As shown in FIG. 5, the classroom master unit 170 forwards the four audio channels and sends/receives data to and from the keypads 194 via an RS 485 T/R device 262. The site controller 178 sends to the remote processors 460 the setup commands and interactive branching commands and algorithms, as described below. Therefore, code interpretation is preferably accomplished by the master unit processor 178, while switching is preferably performed by a remote processor 460 in each keypad 194. The site controller 178 collects student responses from the keypads 194.

The master unit, although preferably located in each classroom, can also be located at home or in one central location.

E. Subscriber Interface

Figure 8:
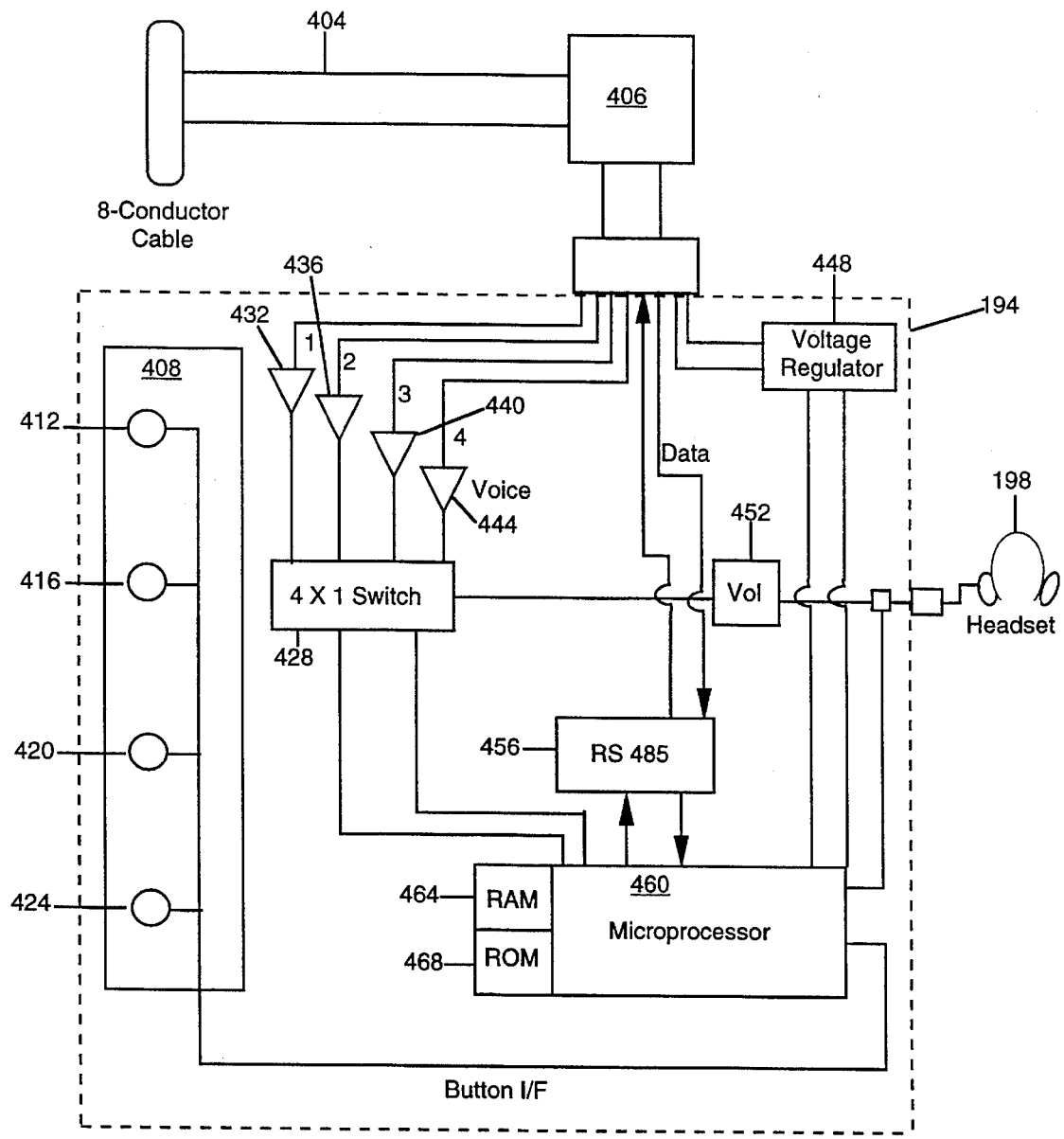
FIG. 8 is a diagram of the components of the subscriber keypad and connecting headset configuration.

Each student interacts with the system via a subscriber interface 194, shown in FIG. 8. In the preferred embodiment, each participant uses a keypad 194, with processor 460, and a pair of headphones 198 to respond to questions presented on the monitor 186.

The keypad 194, as shown in FIG. 8, preferably comprises four function keys 412,416,420,424. However, the present invention can accommodate any number of labelled or unlabelled keys including keys labelled 0–10, "YES" and "NO" labelled keys, and "TRUE" and "FALSE" labelled keys. The invention can also accommodate an LCD panel for receiving messages and confirming answers.

The keypad device 194 provides direct program access for the participant. The classroom master unit processor 178 issues a unique ID code (e.g. Social Security number) for each participant. The keypad 194 allows input of a multiple digit entry for identification. When the user enters an ID code on the keypad 194, the processor 178 preferably checks each participant ID code entry against a list stored in memory 284 shown in FIG. 5. If the entered ID code is verified, the participant will be able to receive the interactive audio channels and data.

In the preferred embodiment, the keypad processor 460 is an 80C451 based microcontroller. However, any similar processor can also be utilized in the present invention.

As shown in FIG. 8, the keypad processor 460 preferably controls a 4×1 switch 428, the output of which is an appropriate audio channel to be sent to the headphones 198. If more than four audio channels are provided, then an n ×1 switch is preferred, where n corresponds to the number of audio channels. The audio channels are amplified by buffer amps which feed the 4×1 switch 428. The output of the 4×1 switch 428 goes to an amplifier 452 with volume control and then is passed to headphones 198.

As the program progresses, at various points, the participants are requested to enter responses via the keypad 194. These requests are preferably displayed on the TV monitor 186 at the front of the classroom. As discussed above, the interactive programming preferably consists of graphics interrogatory messages 480 shown in FIG. 9, with correct and incorrect answers 484 shown in FIG. 10, overlaid on the video. The preferred four audio tracks, preferably recorded in the instructor's own voice, corresponding to correct and incorrect answer choices, are forwarded to the keypads 194 and specifically, the 4×1 switch 428.

The keypad 194 allows the student to interface with the interactive programming by depressing keys 408 corresponding to answers of an interrogatory message. For example, in a multiple-choice question mode, each participant selects a keypad button 408 corresponding to his or her choice. As a result of that selection, the 4×1 switch 428 is directed by the processor 460 to switch to the proper audio channel. The user selection is mapped into one or the plurality of audio responses, comprising one or a combination of linked audio segments, after it is applied to a branching algorithm.

In this manner, each participant hears a different and personalized response in the instructor's own voice via the headphones 198. Therefore, a large classroom of students and/or single students at home or in separate classrooms can view the same video on the display monitor(s) 186, but can carry on their own unique dialogue with the interactive program. As discussed below, the power of this system can be increased exponentially via preloading of additional audio tracks expanding personalized delivery and the mechanism of memory branching wherein the system actually remembers and uses the student's earlier selections to present or compose unique messages to the student. Preloading can occur in set top terminal or school master unit memory also.

The range of possible audio responses can be dramatically increased by preloading audio segments. The common factor in all these embodiments is the effective use of time. First, more than the preferred four audio response segments to an interrogatory message can be transmitted by preloading the memory 284 at the classroom master unit 170. Preloading can be accomplished by sending additional audio segments in a time period prior to that period in which the normal four audio responses are sent, e.g. while the instructor is proceeding with his or her lecture. For example, three audio segments can be retrieved from the instructor's computer 114 and simultaneously transported to the audio mixer 118 at time $t_{n-1}$. The plurality of audio channels combined with the instructor's live voice audio are output from the audio mixer 118, embedded in the video signal by the inserter 214, and transmitted to the remote sites.

After being received at the remote site, the extractor 174 forwards the instructor's audio to the remotes 194 while the additional response audio segments are stored in memory 284. Meanwhile, the graphics video 472 with interrogatory message 480 is displayed on the monitor 186. When the instructor requests that the students enter their answers on the keypads 194 at time $t_n$, then preferably four more audio responses are output from the instructor's PC 114, passed through the audio mixer 118, embedded in the video signal at the inserter 114 and transmitted to the remote sites. Near the end of the answer period, the audio responses are extracted from the video signal. Simultaneously, the controller 178 sends a command to retrieve the three stored audio responses from memory 284. These audio segments are retrieved from memory 284, aligned with the newly transmitted audio responses and forwarded to the keypads 194. Of course, a cable 404 capable of carrying additional signals and a higher order switch (e.g., 7×1 switch) are required to provide a greater number of audio response segments, in this example seven alternative audio responses.

Alternatively, the prestored audio responses could be forwarded after the first four audio responses have been received by the remotes 194. In this embodiment, if the student selected an answer which indicates that a stored response is appropriate, he or she will not hear anything for a momentary time period, because the transmitted audio segments must play through. After the first set of audio responses have been sent and received by the remotes 194, then the appropriate stored response is forwarded to the remote 194 to be played for the student. Although this embodiment has been described using three prestored audio responses, any number of such audio responses can be sent during earlier periods in time.

Audio response capacity can be further increased by using stored macros at the remote sites. As in the above embodiments, additional audio response segments must be preloaded into memory 284 at the classroom master unit 170, school master unit, cable master unit or cable set top terminal. However, in this embodiment if the student selects an answer not corresponding to one of the audio answer segments provided to the remote 194, a signal is sent from the keypad 194 back to the classroom master unit 170. The controller 178 interprets the signal and reads the appropriate macro; the selected entry is mapped to a stored audio track, the track is retrieved from memory 284 and forwarded to the student.

In the present invention, the interactive audio branching is preferably performed in the keypad 194. The branching algorithm, preferably defined by a series of branch codes, is downloaded from the teacher control unit 100 to the classroom master unit 170 and forwarded to the keypad processor 460. The keypad processor 460 stores the algorithm in associated RAM memory 464. The algorithm determines the proper channel to switch to as a function of the student selection.

Alternatively, the branching mechanism could be performed in the classroom master unit 170, school master unit, cable master unit or cable set top terminal. In this embodiment, the student keypad selection is forwarded from the keypad 194 to the classroom master unit processor 178. The classroom master unit processor 178 would be connected to a switch and would direct the branching in the switch according to the branching algorithm stored in RAM 284 and the student selected response. The audio signal selected is then simply forwarded to the keypad 194 and attached headphones 148 for the student to hear the correct audio segment.

The branching algorithm can be expanded by utilizing previous user selections in making a decision on a current audio segment. This is the memory branching embodiment. In other words, previous user responses, stored in RAM memory 464 in the keypad 194, are used as input to a logic network, or algorithm. Successive audio output segments can be related in a "decision-tree" type relationship. The logic network, or algorithm, processes the data input for selection of an audio output response message. This memory embodiment goes well with the expanded audio response capability described above. Audio response segments can be tailored to match different levels of student performance.

Another embodiment uses "stacking" to increase the answer response options. The expansion is due to linking separate audio segments separated in time to form a greater number of answer responses. The following example illustrates the use of stacking as well as memory branching, described above. The left hand column of the example shows the interactions between the program and the student. The right hand column shows the logic applied and branching performed by the keypad.

| TYPE OF INTERACTION | ACTION TO BE PERFORMED |
| --- | --- |
| 1. Can you tell time? | Store button pressed in memory A |
| (1) YES | If button = 1, go to track 1 |
| (2) | If button = 2, go to track 3 |
| (3) | If button = 3, go to track 3 |
| (4) NO | If button = 4, go to track 2 |
|  | If no button pressed, go to track 3 |
| RETURN FROM BRANCH | GO TO TRACK 1 |
| 2. What time is it? | Store button pressed in memory B |
| (1) 2:30 | If button = 1, go to track 1 |
| (2) 3:30 | If button = 2, go to track 2 |
| (3) 3:50 | If button = 3, go to track 3 |
| (4) 4:00 | If button = 4, go to track 4 |
|  | If no button pressed, go to track 4 |
| NOTE: 3:30 (button (2)) is the correct answer. | |
| Recall response from question 1 | Recall memory A and branch as follows: |
| TRACK 1: "You said you know how to tell time . . ." | If memory A = 1, go to track 1 |
| TRACK 2: "You said you don't know how to tell time . . ." | If memory A = 4, go to track 2 |
| TRACK 3: "You didn't indicate if you can tell time . . ." | If memory A = 2 or 3, go to track 3 |
| Memory branch | Branch as follows: |
| TRACK 1: ". . . and you weren't kidding. Great Work!" | If memory A = 1 and memory B = 2 (correct) go to track 1 |
| TRACK 2: ". . . but you sure learned fast. That's great." | If memory A ≠ 1 and memory B = 2 (correct) go to track 2 |
| TRACK 3: ". . . and with more work, you will learn more." | If memory A = 1 and memory B = 1, 3 or 4 (incorrect) go to track 3 |
| TRACK 4: ". . . but with more work, you will learn more." | If memory A ≠ 1 and memory B = 1, 3 or 4 (incorrect) go to track 4 |
| RETURN FROM BRANCH | GO TO TRACK 1 |

Stacking is evident in the above example by the increased number of optional audio messages formed by linking the later two branches indicated in the example above. The possible branch combinations are provided, as follows:

Branch #1 to Branch #1
Branch #2 to Branch #2
Branch #3 to Branch #2

Branch #1 to Branch #3
Branch #2 to Branch #4
Branch #3 to Branch #4

Therefore, the present invention covers numerous methods for increasing the interactive audio response capabilities.

Referring to FIG. 8, the keypad 194 is attached to 8-conductor cable 404 by RJ-45 connectors 406. Alternatively, physical connections can be dispensed with completely by using keypads 194 that have the capability of sending and receiving infrared commands to the classroom master control unit 170. If the keypad 194 connects to the site controller 178 by infrared connection, the keypad 194 utilizes a battery as a power source.

The input into the handset 194 from the RJ-45 connector 406 includes the plurality of audio channels, data codes, and a voltage differential provided by plus 12 volts signal and ground. Data from the master unit processor 170 is transferred to the remote processor 460 via an RS-485 interface 262.

F. Return Path

Status messages and participant responses are sent back from the remote sites to the teacher control system 100 via return paths. The return paths can be dial-up telephone lines or via an X.25 packet switched network, cable, wireless networks, etc. The preferred method of sending this information is by polling the remote sites from the administrative computer 122. Alternatively, the remote sites can send performance information and messages after consolidation, at periodic intervals.

At the end of the program, the classroom master unit 170, school master unit or remote set top terminal prepares a report which can be printed out and/or transmitted back to the headend. In the event that the program was recorded and watched at a later time from the normal broadcast, the classroom can either immediately call the host computer 134 and deliver it's report or send the report at a predetermined time that was preset by the program.

Packets of relevant data for the entire classroom (e.g., site ID, user selections, number of correct and incorrect answers, etc.) are created and formatted at the classroom master unit 170. These packets are stored at the classroom master unit 170 until the unit 170 is polled by the administrative computer 122 for information retrieval. Any suitable polling request and response message format may be used to query each classroom master unit 170, one by one. The classroom master units 170 are identified by a classroom master unit identifier. For bandwidth efficiency, it is preferred that the classroom master unit 170 transmit information and messages to the teacher control unit 100 only when allowed to do so by the teacher control unit 100. Sites that are connected during broadcast send statistical information to the teacher control unit 100 after each question. At conclusion of the program, the sites send detailed data on the full class performance back to the headend. The site controller 178 is also preferably programmed to keep track of all the participant scores, and when a particular level (e.g., class performing above a predetermined standard) is attained, the controller 178 can send a message to the teacher control unit 100 indicating that the site has attained a particular level of performance.

If the classroom master units 170 use Internet, the units would interface via an X.25 gateway. If the system uses the Public Switched Telephone Network (PSTN), the interface preferably consists of telco interfaces 308. Alternatively, the system may return information using upstream cable using appropriate technology. In a more complex system with thousands of sites, a networking ability such as that available from a national carrier is preferred.

Voice circuits can also be established between the remote sites and the teacher control unit 100. These circuits also interface with the telco interface units 308. However, because instantaneous personalized instruction is attained in the present invention via the transmitted one-way interactive programming signal, return voice circuits are not necessary in the present invention. Voice circuits can also be established through a cable television system if so equipped in which case a link is established between the cable headend and the teacher control unit 100.

All return information sent from the classroom master units 170 is received at the teacher control unit 100 and forwarded to the host personal computer 134. If the PSTN is used for return paths, the information is received by telco interface units 128, as shown in FIG. 2. The telco answering units 128 route participant audio to the audio mixer and data packets to the host computer 134.

The administrative computer 122 polls the remote sites for student response data. Polling software is loaded into the administrative computer 122 for performing polling [unc-tions. The host computer 134 contains software for tallying student scores, organizing student scores into class statistics, and organizing data into bar graph or chart form. The host computer 134 processes the data according to programmed software instructions, and reformats the data for printing or display. The student and class evaluation statistics for the interrogatory messages can be displayed on a monitor 202 for viewing by the instructor.

This information gives the instructor enough statistical data to gauge the effectiveness of the teaching even though the students are not visible to the instructor and allows the instructor to control the pace of the distance learning lesson. In addition, the performance feedback provides the instructor with an accurate measurement of each students progress so that steps can be taken before students fall too far behind.

The instructor may use the feedback to highlight a certain class that, for example, had a superior performance rate or an especially deficient performance rate. For example, the instructor could transmit a message over the distance learning system 98 such as follows: "Great job, Toledo. How have you done so well?" The teacher hits a button on the computer 114 designating the Toledo classroom. A data command is sent over the direct learning system 98 and is received by the Toledo classroom master unit 170 as part of the interactive video signal. The command instructs the site controller 178 to connect up a return telephone line back to the head-end 100. The Toledo processor 178 redials the teacher control system 100 automatically and establishes a voice link.

Individual students at the remote classroom may speak to the instructor via the telephone 190. The instructor at the teacher control unit 100 then reroutes the remote voice link into the audio mixer 118 so that the conversation between the instructor and the Toledo classroom can be heard at all remote classroom locations.

III. System Operation

The direct learning system 98 uses one video and two or more simultaneously transmitted and related audio signals, permitting each student at the multiple classroom locations to interact with the television presentation and receive different segments of the transmitted audio programming without making a conscious choice to change channels.

When the instructor is ready to begin the lecture, an INITIATION command is sent from the instructor's personal computer 114 to all the remote site controllers 178 and set top boxes. The site controller 178 forwards this command to the keypads 194. Each keypad 194 defaults to a predetermined channel (e.g., channel 1). The site controllers 178 send a command requesting the participant to "INPUT YOUR ID." The participant then enters an identification code. The classroom master unit 170 checks the entered ID against a list of valid IDs in memory 284 and sends a message to the keypad 194 informing the user whether or not the entry is valid. If the ID is invalid, the participant is denied access to the system.

Assuming a valid ID has been entered, the classroom master unit processor 178 instructs the keypad 194 to switch to a predetermined audio channel or the set top box is instructed to tune to a particular audio channel. The students hear the instructor begin the lecture via this channel. The student also views the instructor via video display on the television monitor 186.

The instructor's lecture is transmitted from the teacher control unit 100 to the authorized students at the remote locations. At some point during the lecture, the instructor may desire to query the students, such as follows: "Alright, students. It's time to answer some questions." The instructor will click on a PICON displayed on the instructor's personal computer 114 which preferably designates a particular interrogatory message. The interrogatory graphics message file is called from memory. The graphics slide 472 is transmitted as video to the remote sites. The students view the graphics slide 472 on the television while listening to the instructor on channel one. The teacher informs the students to answer the question, by stating for example, "OK, everyone please answer the question now." At this point, a plurality of related audio messages are embedded in the video signals and transmitted to the remote classroom sites.

Simultaneously, a BEGIN INPUT command is sent to all of the remote site controllers 178 instructing then to accept input from the keypads 194. The controller 178 decodes the command and forwards a similar command to the keypads 194. The last input before the expiration of the INPUT period is accepted as the student's selection by the system.

At each remote classroom site, the embedded plurality of audio channels and data codes are extracted, amplified and sent to the keypads 194. The audio channels correspond to correct and incorrect answer choices to the interrogatory message. The data codes are decoded by the site controller 178 and the interactive program branching codes are sent to each keypad 194. An interrogatory message 480 continues to be displayed on the television screen as shown in FIG. 7.

There are several different types of interrogatory messages 480. Objective messages are questions that have a specific right answer (True/False, multiple choice [A, B, C, or D], YES/NO, direct entry). Demographic questions are questions that ask the student's opinion and have no right or wrong answer. A student can also be asked to rate or rank a list. Preferably, four separate optional inputs are available for selection by the student. A student can also be asked for personal information (e.g., "Are you a boy or a girl?").

Information is stored on each audio signal, each of which comprises a complete or part of a message in response to the selection on the keypad 194. Therefore, when a key 408 is depressed on the keypad 194, a personalized response is branched to the headphones 198 corresponding to the answer. The personalized response is recorded in the instructor's own voice and provides an explanation as to why the student's particular choice is correct or incorrect and may also provide helpful hints for avoiding future mistakes.

Referring to FIG. 7, the student chooses one of the four options 484: A, B, C or D. Assuming that the student chooses an incorrect answer, such as D, the keypad processor 460 immediately switches to the audio segment stating, for example: "You are incorrect. 4 plus 2 is equal to 6, and when subtracted from 5 plus 6, or 11, equals the correct answer which is 5, or selection C. Instead of subtracting 6 from 11, you probably incorrectly added 6 to 11 to obtain the answer choice stated in D, i..e, 17." Other audio segments, related in time to that provided above, provide explanations to the other answer choices. As described above, the capacity of possible audio responses can be increased far beyond four by the stacking process using preloaded alternative audio segments.

Almost instantaneously, the user selection is transmitted back to the classroom master unit controller 178. The controller 178 stores this selection, and all other participant selections in RAM 286 for later return to the head-end upon a polling command from the teacher control unit 100 or periodic update to the teacher control unit 100.

A useful tool for instruction in the present invention is the utility of memory branching. The branching algorithm can be expanded to allow for a more individualized response by using previous user selections to determine an output audio segment. This is termed memory branching. Different branching algorithms are formed by sequences of branch codes that are sent from the head-end to each of the remote sites. As described in some of the above-identified ACTV patents and applications, the direct learning system 98 can utilize memory accumulation to tailor personalized audio messages according to a decision tree logic algorithm. The algorithm utilizes previous responses to deliver a personally tailored information message for a particular student.

Student selections are preferably stored in memory separately for each student. Therefore, a unique message can be compiled for each student. For example, while one student is provided additional instruction in an area where he or she is scoring low, other students can move ahead with more challenging material. Memory branching can be used with preloaded audio so that the audio interactivity is increased due to a larger number of possible audio responses.

Memory branching is a technique where the instructor recalls a previous input(s) the student selected earlier. When using memory, the individual audio responses, or memory branches, are occurring in real time simultaneously. As the following examples demonstrate, the timings of the branches need not be exactly the same, just close.

There are four categories of memory-use for personalized instruction: (1) simple recall memory branches; (2) summary memory branches; (3) comparative memory branches; and (4) conclusive memory branches.

The easiest form of memory branching, or simple recall, merely repeats the selections the viewer has indicated previously. These branches may be similar to the audio branches to the initial question. The difference is that these branches do not occur just after the question is asked, but actually occur some time after the question is asked. For example, the instructor may state: "I remember . . ."

MEMORY BRANCHES

Branch 1: You said you do own a personal computer.

Branch 2: You said you don't own a personal computer.

Branch 3: You didn't say if you owned a computer.

Summary memory branches tally the correct responses in a section of a program, or the entire program. Depending on the circumstances, these summaries can be quantitative or qualitative, or a combination of the two.

As with regular audio branches, if there are four audio branches to a question, then there can be no special branch for someone who failed to choose an answer. However, if there are less than four stated choices for the participant, a memory branch covering those who failed to choose an answer would be appropriate.

The quantitative summary memory branches mention the actual number of responses provided by the participant during a particular segment of the program, for example:

MEMORY BRANCHES

Branch 1: You answered all of the last three questions correctly. Fantastic

Branch 2: You answered two of the last three questions right. Very good.

Branch 3: You answered one of the last three questions right. Keep trying.

Branch 4: You missed all of the last three questions. Don't worry, keep trying.

The qualitative summary memory branches do not mention the actual number of responses totaled, but provide a qualitative response to the participant based on the participant's progress, for example:

MEMORY BRANCHES

Branch 1: You're getting all my questions right! You're learning well today! I'm so proud of you!

Branch 2: I can see you're learning how to use "Wait, Think, See, So." Keep up the good work.

Branch 3: I hope you're learning how to use "Wait, Think, See, So." Keep trying and you'll succeed.

A combination of the quantitative and qualitative approaches can be used to reward success but avoid punishing failure. The combination summary memory branches use quantitative language for the successful participants, but qualitative memory branches for the unsuccessful participants. An example is provided below:

MEMORY BRANCHES

Branch 1: You answered all three of the last questions correctly. Fantastic!

Branch 2: You answered two of the last three questions right. Very good.

Branch 3: Some of these questions can be difficult. Don't be discouraged.

A special form of summary branches is known as stacking. With stacking, the present invention can offer more than four possible summary branches. For instance, at the end of a program, the following memory branches may be offered:

MEMORY BRANCHES

Branch 1: You answered all seven of my questions correctly. Outstanding!

Branch 2: You answered six of my seven questions correctly. Well Done!

Branch 3: You answered five of my seven questions correctly. Good going.

Branch 4: I want to thank you for joining me on this program. It was fun.

The first three branches provide specific responses. The fourth branch merely offers generic positive reinforcement. A new set of memory branches immediately follows the first set:

MEMORY BRANCHES

Branch 1: You answered four of my seven questions correctly. Good work.

Branch 2: You answered three of my seven questions correctly. Good try.

Branch 3: I asked you some tricky questions and you did your best. Good job.

Branch 4: I want to thank you for joining me on the program. It was fun.

The second set of branches continues listing the quantitative outcomes, until the third branch, which becomes qualitative. The fourth branch is generic positive reinforcement.

When the two memory branches are successively played over the headphones 198, the participant will hear one of six specific outcomes and a generic positive reinforcement, although not necessarily in that order. A participant might hear, "You answered five of my seven questions correctly. Good going. I want to thank you for joining me on this program. It was fun." Or, the participant might hear, "I want to thank you for joining me on this program. It was fun. You answered four of my seven questions correctly. Good work."

A comparative memory branch is an elaborate version of the summary memory branch. These branches compare several previous responses. For example, the participant is asked three different times what he/she thinks the order of finish will be in a race. If there are four choices as to the order of finish, there are sixty four possible combinations of responses. However, if prepared properly, the four memory branches at the end of the race will cover everyone.

Conclusive memory branches relate one response to another response. For example, after the instructor repeats a question asked earlier in the program, the participant might hear:

MEMORY BRANCHES

Branch 1: You've changed your mind. Very interesting.

Branch 2: You haven't changed your mind. Interesting.

Branch 3: You couldn't decide. Hmm. Very interesting.

Although these branches compare two different responses, the fact that the participant has changed his/her mind doesn't indicate whether the participant was right or wrong. This distinguishes the conclusive memory branch with the comparative memory branch. As another example, after entering his/her choice, a viewer might hear:

MEMORY BRANCHES

Branch 1: So you agree with Smithers.

Branch 2: So you disagree with Smithers.

Branch 3: It's not clear if you agree with Smithers.

"Smithers" could be a student who joined the instructor at the head-end.

The four basic categories of memory branching can be used together to create a powerful instruction tool. For example, assume that the instructor is near the end of a European history program. The instructor is joined in the studio at the head-end by a student, "Bob," who also tries to answer the instructor's questions.

The instructor first asks the students at the remote locations a question: "Who fought at the Battle of Waterloo?" Each student gives his/her response on the keypad 194. Then the instructor asks Bob for his response. Bob gives his answer. Then the instructor says to the students at the remote locations: "Hmm. Your answer was . . ."

MEMORY BRANCHES (Simple Recall)

Branch 1: Emperor Franz Joseph

Branch 2: Alexander the Great.

Branch 3: Napoleon Bonaparte.

Branch 4: Otto von Bismark.

MEMORY BRANCHES (Conclusive)

Branch 1: You agreed with Bob.

Branch 2: You disagreed with Bob. "Perhaps you're not so sure of your response now, so I'll give you another chance." (The question is repeated and the students select a new answer.)

MEMORY BRANCHES

Branch 1: You've changed your answer. This question is tricky.

Branch 2: You haven't changed your answer. You're confident. (After the correct response is given, a final comparative memory branch puts this into context.)

MEMORY BRANCHES

Branch 1: Oh, you had the right answer earlier! You should not have let Bob sway you!

Branch 2: You got the right answer the second time around. You showed real determination.

Branch 3: You missed the right answer both times, but I appreciate all your efforts today.

Branch 4: You had the right answer all along! You really know your European history! "On today's program,"

MEMORY BRANCHES (Summary — Combination)

Branch 1: All your answers were correct. You were sensational

Branch 2: Most of your answers were correct. You were terrific.

Branch 3: Some of your answers were correct. Good trying.

Branch 4: European history can be tricky. You'll improve.

As evidenced by this example, the student is an active and important participant, engaged in a dialogue with the television program.

The above are simple examples of memory branching concepts. More elaborate presentations can be created and provided by the present invention. An almost infinite number of summary memory branches can be stacked to create a multitude of possible message combinations.

The present invention allows for an interactive session to be recorded while retaining the interactive elements for a participant's later viewing. In the present invention, the codes and multiple audio channels are embedded in the interactive video signal. The program can be recorded on tape according to the methods described in the above-identified ACTV patents. The videotape could be played back at the student's convenience on a VCR either at the teacher control unit 100 or at the classroom master control unit 170.

Current distance learning systems require return paths for individualized instruction. The present invention does not require return paths. The optional return paths in the present invention are simply for facilitating distance learning system management functions and enhancing the educational experience. The return paths in the present invention give the instructor a level of understanding of how well the students are responding, thereby allowing the instructor the ability to gauge the effectiveness of the lecture. If the return scores indicate that a majority of students are deficient in a certain area, the instructor can focus instruction in that area.

The provision of return paths requires a tradeoff of bandwidth versus the benefits provided the instructor in receiving student performance feedback. In one embodiment, return paths from half of the sites could be eliminated without affecting participant interaction. Even though the instructor is only receiving performance indications from half the classrooms, this reduced amount of information is sufficient to allow the instructor feedback on the comprehension of the lecture. In any event, expensive and extensive return paths are minimized in the present invention.

Using the foregoing embodiments, methods and processes, the distance learning system of the present invention maximizes personalized responses to students in real time using a low cost interactive system. Although the present invention has been described in detail with respect to certain embodiments and examples, variations and modifications exist which are within the scope of the present invention as defined by the following claims.

Having described our invention, we claim:

1. A distance learning classroom reception system used by subscribers to receive an interactive program at one or more classroom control units which permit each subscriber to interact with the interactive program individually and to receive uniquely personalized, meaningful instruction responses as if receiving feedback directly from a private tutor or instructor, the system comprising:

at least one means for receiving the interactive program, wherein the interactive program contains a plurality of audio channels, control data and a video signal, wherein the control data contains branching codes and the interactive program contains one or more interrogatory messages for eliciting subscriber responses;

at least one classroom master unit, connected to the receiving means, comprising:
first means for storing the control data;
controller means, connected to the first storage means, for reading the control data and controlling operation of the classroom master unit;

at least one display means, connected to the classroom master unit, for displaying the video signal;

at least one means, connected to the classroom master unit, for gathering subscriber responses to the interrogatory messages resulting from the presentation of the interactive program, the gathering means comprising:
means for obtaining the audio channels and the branching codes from the classroom master unit;
audio selection means, operably connected to the obtaining means, for
creating a personalized audio response by branching between the plurality of audio channels, each branch determined based on the branching codes and the one or more subscriber responses, whereby numerous different audio responses are created; and means, connected to the audio selection means, for presenting the personalized voice response to the subscriber, whereby each of the subscribers interacts individually with the interactive program and each subscriber hears an individualized audio feedback response.

2. The distance learning classroom reception system of claim 1 wherein the plurality of audio channels, video signal and data of the interactive program are embedded in a standard NTSC video format and the classroom master unit further comprises a means for extracting the audio channels and control data from the standard NTSC video format.

3. The distance learning classroom reception system of claim 1 wherein the plurality of audio channels, video signal and control data of the interactive program are digitally encoded and combined in a composite digital interactive signal and the receiving means further comprises:

means for demultiplexing the digital audio channels, video signal and data from the composite digital interactive signal; and means for converting the demultiplexed digital audio channels and the demultiplexed digital video signal into analog signals.

4. The distance learning classroom reception system of claim 1 further comprising a means for recording the interactive program without loss of interactive capability.

5. The distance learning classroom reception system of claim 1 wherein the gathering means further comprises a means for storing one or more previous subscriber entries and wherein the audio selection means comprises means for processing the previous subscriber entries along with the current subscriber entry so that a branch is based on prior subscriber entries, the current subscriber entry and the branching codes in formulating the complete personalized audio response.

6. The distance learning classroom reception system of claim 1 wherein the classroom master unit comprises means for transmitting student performance data to a teacher control unit whereby the student performance data is a compilation of student responses to the interactive program.

7. A distance learning teacher control unit used for creating an integrated interactive signal which when transmitted and received at one or more classroom master units will permit one or more subscribers to interact individually with an interactive program and to receive uniquely personalized meaningful instruction messages, as if receiving instruction directly from a private tutor or instructor, comprising:

means for generating a video signal, wherein the video signal comprises one or more interrogatory messages for eliciting a subscriber response;

means for creating control data comprising control codes and branching codes, whereby the codes are used for initiating, controlling, and branching between the plurality of audio channels;

means for providing a plurality of audio channels, the audio channels comprising audio segments, the audio segments being of approximate equal length in time and related in content to each other;

audio mixing means, operably connected to the providing means, for combining audio channels; and means, operably connected to the generating means, creating means and audio mixing means, for combining the video signal, control data and plurality of audio channels into the single integrated interactive signal, whereby the single integrated interactive signal allows for existing broadcast transmission infrastructure to be used.

8. The distance learning teacher control unit of claim 7, the unit further comprising:

means, connected to the generating means, for digitally encoding the video signal;

means, connected to the audio mixing means, for digitally encoding the plurality of audio channels; and wherein the means for combining comprises means for multiplexing the control data, connected to the video digital encoding means and the audio digital encoding means, the plurality of audio channels and video signal into a single composite digital interactive signal.

9. The distance learning teacher control unit of claim 7 wherein the combining means comprises means for embedding the control data, plurality of audio channels and video signal into a standard NTSC video format.

10. The distance learning teacher control unit of claim 9 wherein the video signal contains a vertical blanking interval and the embedding means comprises means for inserting the control data and plurality of audio channels into the vertical blanking interval of the video signal.

11. The distance learning teacher control unit of claim 7 wherein the teacher control unit further comprises a means for processing student information received from remote classroom sites, comprising:

means for receiving student messages and performance data, wherein the performance data is a compilation of student responses to the interactive program;

means, connected to the receiving means for processing the performance data;

means, connected to the processing means, for reformatting the student performance data into display-ready form; and means, connected to the reformatting means for displaying student performance data so that feedback on student performance is provided to the teacher control unit.

12. A distance learning classroom reception system used by one or more subscribers to receive an integrated interactive program at one or more classroom control units which permits each subscriber to view a video signal on a display monitor and to interact with the interactive program individually and to receive uniquely personalized meaningful instruction responses as if receiving feedback directly from a private tutor or instructor, the system comprising:

at least one means for receiving an integrated interactive program, wherein the interactive program contains a plurality of audio channels, control data and a video signal, wherein the control data contains branching codes and the interactive program contains one or more interrogatory messages for eliciting subscriber responses;

at least one classroom master unit, connected to the receiving means, comprising:
a means for extracting the audio channels, video signal and control data from the interactive program;
a means, connected to the extracting means, for storing the control data; and
a controller means, connected to the extracting means and the storage means, for reading the control data and controlling operation of the classroom master unit;

at least one means, connected to the classroom master unit, for gathering, subscriber responses to the interrogatory messages resulting from the presentation of the interactive program, the gathering means comprising:

means for entering a subscriber response to the interrogatory message;

means for obtaining the audio channels and the branching codes from the classroom master unit;

audio selection means, operably connected to the entry means and the obtaining means, for creating a personalized audio response from the plurality of audio channels, comprising:

means for branching between the plurality of audio channels to form a personalized response, wherein each branch is determined based on the one or more subscriber responses and the branching codes; and means, connected to the audio selection means, for presenting the personalized voice response to the subscriber, whereby each of the subscribers interacts individually with the interactive program and each subscriber hears an individualized audio feedback response.

13. The distance learning classroom reception system of claim 12 further comprising a means for recording the interactive program, wherein the recorded interactive program retains full interactivity.

14. The distance learning classroom reception system of claim 12 wherein the gathering means further comprises a means for storing one or more previous subscriber entries and wherein the audio selection means further comprises means for processing the previous subscriber entries along with the current subscriber entry so that a branch is determined based on the previous subscriber entries, the current subscriber entry and the branching codes in formulating the complete personalized audio response.

15. The distance learning classroom reception system of claim 12 wherein the classroom master unit further comprises;

means for transmitting student performance data to a teacher control unit wherein the student performance data is a compilation of student responses to the interactive program.

16. A method for offering an integrated interactive signal which when transmitted and received at one or more classroom master units enables each subscriber to interact with the interactive program individually and to receive uniquely personalized meaningful instruction messages, the method comprising the steps of:

creating a single interactive signal comprising a plurality of audio channels, control data and a video signal, wherein the video signal contains one or more interrogatory messages with subscriber selectable options and the control data contains branching codes;

transmitting the single interactive signal to at least one receive site location;

distributing the single interactive signal to a at least one classroom master unit, each master unit;

receiving the single interactive video;

extracting the audio channels and control data from the single interactive video signal;

displaying the video signal on a display monitor;

gathering subscriber selections to the subscriber selectable options to the interrogatory message displayed on the display monitor;

branching between the plurality of audio channels to form a personalized response for each subscriber, wherein one or more subscriber selections and the branching codes are used in formulating a personalized audio response; and presenting the personalized response to the subscriber, whereby each subscriber interacts individually with the interactive program and each subscriber hears a uniquely personalized audio response.

17. A method for preparing an educational interactive program for transmission in a distance learning system as a single interactive video signal comprising a video signal, plurality of audio channels and control data, to at least one remote classroom location for multiple subscribers, the method comprising the steps of:

creating at least one graphics slide with interrogatory messages, each interrogatory message including subscriber selectable options;

recording verbal explanations corresponding to each subscriber selectable option;

formatting the recorded verbal explanations into a plurality of audio signals;

creating files comprising the graphics slides, corresponding audio signals and control codes for controlling presentation of the interactive program at the remote site locations;

storing files in a relational database with pointers establishing the relationship between the graphics and audio signals;

selecting a see of files for broadcast to remote receiver sites;

outputting graphics slides to a video mixer;

transferring audio signals to an audio mixer;

combining the plurality of audio signals, graphics video slide, and control codes into a single interactive signal; and transmitting the single interactive signal to remote site locations.

18. A distance learning classroom reception system used by one or more subscribers to receive a integrated interactive program at one or more classroom control units and view a video signal on a display monitor which permits each subscriber to interact with an interactive program individually and to receive uniquely personalized instruction responses, the system comprising:

at least one means for receiving an integrated interactive signal, wherein the interactive signal contains a plurality of audio channels, control data and a video signal, wherein the control data contains branching codes and the interactive signal contains one or more interrogatory messages for eliciting subscriber responses;

at least one means for extracting the audio channels, video signal and control data from the single interactive signal;

at least one means for entering subscriber responses to the interrogatory messages resulting from the presentation of the interactive program;

at least one classroom master unit, connected to the extracting means and entry means, comprising:
a means for storing the control data;
a means for gathering the subscriber responses from the entry means;
a controller means, connected to the extracting means and the storage means, for reading the control data and controlling operation of the classroom master unit;

audio selection means, operably connected to the first storage means and the gathering means, for creating a personalized audio response from the plurality of audio channels, comprising:
   means for branching between the plurality of audio channels to form a personalized response, wherein each branch is determined based on the one or more subscriber responses and the branching codes; and
at least one means, connected to the classroom master unit, for presenting the personalized voice response to each subscriber, whereby each subscriber interacts individually with the interactive program and each subscriber hears an individualized audio feedback response in real time.

19. An interactive classroom presentation system permitting students to individually interact with an interactive program by responding to subscriber selectable entry options, preferably presented as part of a video signal displayed on a monitor, and to receive personalized instruction responses, the system comprising:
   at least one control unit, comprising:
      at least one means for receiving the interactive program, wherein the interactive program contains a plurality of audio channels, branching codes and a video signal, wherein the interactive program contains subscriber selectable entry options; and
   at least one means, in communications with the control unit, for gathering subscriber responses to the subscriber selectable entry options, each gathering means comprising:
      a means for obtaining the audio channels and the branching codes from the interactive program; and
      audio selection means, operably connected to the obtaining means, for creating a personalized audio response by branching between the plurality of audio channels using one or more subscriber responses and branching codes; and
   a means for presenting the selected personalized audio response to the subscriber.

20. The interactive classroom presentation system of claim 19 wherein the receiving means comprises a means, connected to the receiving means, for extracting each of the audio channels and branching codes from the interactive program.

21. The interactive classroom presentation system of claim 19 wherein the interactive program is pre-recorded and the system further comprises an external memory device, connected to the receiving means, wherein the pre-recorded interactive program is stored in the external memory device.

22. The interactive classroom presentation system of claim 19 wherein the interactive program is pre-recorded and stored on a VCR tape and the system further comprises a VCR, connected to the receiving means.

23. The interactive classroom presentation system of claim 19 wherein the plurality of audio channels, the video signal and the branching codes of the interactive program are embedded in a standard NTSC video format and the receiving means comprises a means for extracting the audio channels and the branching codes from the standard NTSC video formatted program.

24. The interactive classroom presentation system of claim 19 wherein the plurality of audio channels, the video signal and the branching codes of the interactive program are digitally encoded and combined in a composite digital interactive signal and the receiving means further comprises:
   means for demultiplexing the digital audio channels, the digital video signal and the branching codes from the composite digital interactive signal; and
   means for converting the demultiplexed digital audio channels and the demultiplexed digital video signal into analog signals.

25. The distance learning classroom reception system of claim 19 wherein the gathering means further comprises a means for storing one or more previous subscriber entries and wherein the program selection means comprises means for processing the previous subscriber entries along with the current subscriber entry so that the audio branch is based on the prior subscriber responses, the current subscriber response and the branching codes in formulating the complete personalized audio response.

26. An interactive classroom presentation system permitting students to individually interact with an interactive program by responding to subscriber selectable entry options, preferably presented as part of a video signal displayed on a monitor, and to receive personalized instruction explanatory responses, the system comprising:
   at least one means for gathering subscriber responses to subscriber questions, wherein the subscriber questions are presented as part of the interactive program;
   at least one control unit, connected to the gathering means, comprising:
      at least one means for receiving the interactive program, wherein the interactive program contains a plurality of audio channels, branching codes and a video signal; and
      audio selection means, operably connected to the receiving means and the gathering means, for creating a personalized audio response by branching between the plurality of audio channels using one or more of the subscriber response and the branching codes; and
   a means for presenting the selected personalized audio response to the subscriber.

27. The interactive classroom presentation system of claim 26 wherein the receiving means comprises a means, connected to the receiving means, for extracting each of the audio channels and branching codes from the interactive program.

28. The interactive classroom presentation system of claim 26 wherein the interactive program is pre-recorded and the system further comprises an external memory device, connected to the receiving means, wherein the pre-recorded interactive program is stored in the external memory device.

29. The interactive classroom presentation system of claim 26 wherein the interactive program is pre-recorded and stored on a VCR tape and the system further comprises a VCR, connected to the receiving means.

30. The interactive classroom presentation system of claim 26 wherein the plurality of audio channels, the video signal and the branching codes of the interactive program are embedded in a standard NTSC video format and the receiving means comprises a means for extracting the audio channels and the branching codes from the standard NTSC video formatted program.

31. The interactive classroom presentation system of claim 26 wherein the plurality of audio channels, the video signal and the branching codes of the interactive program are digitally encoded and combined in a composite digital interactive signal and the receiving means further comprises:
   means for demultiplexing the digital audio channels, the digital video signal and the branching codes from the composite digital interactive signal; and
   means for converting the demultiplexed digital audio channels and the demultiplexed digital video signal into analog signals.

32. The interactive classroom presentation system of claim 26 wherein the gathering means further comprises a means for storing one or more previous subscriber entries and wherein the program selection means comprises means for processing the previous subscriber entries along with the current subscriber entry so that the audio branch is based on the prior subscriber responses, the current subscriber response and the branching codes in formulating the complete personalized audio response.

33. An interactive classroom presentation system permitting students to individually interact with a prerecorded interactive program by responding to subscriber selectable entry options, preferably presented as part of a video signal displayed on a monitor, and to receive personalized instruction responses, the system comprising:

at least one control unit, comprising:

at least one means for playing the pre-recorded interactive program, wherein the interactive program contains a plurality of audio channels, branching codes and a video signal, wherein the interactive program contains subscriber selectable entry options; and a means, connected to the playing means, for separately extracting each of the audio channels and the branching codes from the prerecorded interactive program;

at least one means, in communications with the control unit, for receiving subscriber responses to the subscriber selectable entry options, each receiving means comprising:

a means for decoding the branching codes from the prerecorded interactive program; and audio selection means, operably connected to the extracting means, for creating a personalized audio response by branching between the plurality of audio channels using one or more subscriber responses and the branching codes; and a means for presenting the selected personalized audio response to the subscriber.

34. An interactive classroom presentation system permitting students to individually interact with a prerecorded interactive program by responding to subscriber selectable entry options and to receive personalized instruction responses, the system comprising:

at least one means for gathering subscriber responses to subscriber questions, wherein the subscriber questions are presented as part of the prerecorded interactive program;

at least one control unit, connected to the gathering means, comprising:

at least one means for playing the prerecorded interactive program, wherein the prerecorded interactive program contains a plurality of audio channels, branching codes and a video signal;

a means, connected to the playing means, for separately extracting each of the audio channels and the branching codes from the prerecorded interactive program; and audio selection means, operably connected to the receiving means and the gathering means, for creating a personalized audio response by branching between the plurality of audio channels using one or more of the subscriber response and the branching codes;

at least one means, connected to the control unit, for displaying the video signal; and a means for presenting the selected personalized audio response to the subscriber.

35. A subscriber unit, in communications with a classroom master unit, to be used as part of an interactive distance learning system providing individualized audio response explanations, whereby each subscriber interacts with an interactive program by responding to subscriber selectable entry options preferably presented as part of a video signal displayed on a monitor, the subscriber unit comprising:

means for entering a subscriber response to the subscriber selectable entry options;

means for receiving a plurality of audio signals and branching codes;

audio selection means, operably connected to the receiving means and the entry means, for creating a personalized audio response by branching between the plurality of audio channels using one or more of the subscriber responses and branching codes; and a means for presenting the selected personalized audio response to the subscriber.

36. A distance learning system classroom master unit that receives an interactive program, wherein the interactive program contains a plurality of audio channels and control data embedded into a video signal, permitting students to individually interact with the interactive program by responding to subscriber selectable entry options and to receive personalized instruction responses, the system comprising:

a means for separately extracting each of the audio channels and the branching codes from the interactive video signal;

a means for receiving a plurality of subscriber responses to the subscriber selectable entry options;

audio selection means, operably connected to the extracting means and the gathering means, for creating a personalized audio response by branching between the plurality of audio channels using one or more of the subscriber response and the branching codes; and a means for presenting an individualized selected personalized audio response to each subscriber.

* * * * *